(12) United States Patent
Moschel et al.

(10) Patent No.: US 8,548,880 B2
(45) Date of Patent: Oct. 1, 2013

(54) METHODS, APPARATUS, SYSTEMS AND COMPUTER READABLE MEDIUMS FOR USE IN ASSOCIATION WITH DETERMINATION OF CUSTOMS DUTIES

(75) Inventors: Andreas Moschel, Wald-Michelbach (DE); Hans Chelniak, Hockenhelm (DE); Paul Skiba, Ratingen (DE); Torsten Stolz, Mannheim (DE); Jochen Thierer, Bruchsal (DE)

(73) Assignee: SAP AG, Walldorf (DE)

( * ) Notice: Subject to any disclaimer, the term of this patent is extended or adjusted under 35 U.S.C. 154(b) by 41 days.

(21) Appl. No.: 12/715,736

(22) Filed: Mar. 2, 2010

(65) Prior Publication Data

US 2011/0218895 A1    Sep. 8, 2011

(51) Int. Cl.
*G07B 17/00* (2006.01)
*G07F 19/00* (2006.01)
*G06F 17/22* (2006.01)
*H04M 15/00* (2006.01)
*G06Q 10/00* (2012.01)

(52) U.S. Cl.
USPC ................ 705/31; 705/30; 705/34; 705/28

(58) Field of Classification Search
None
See application file for complete search history.

(56) References Cited

U.S. PATENT DOCUMENTS

| | | | | |
|---|---|---|---|---|
| 5,926,822 | A * | 7/1999 | Garman | 715/201 |
| 6,567,789 | B1 | 5/2003 | Baker | |
| 7,596,500 | B1 * | 9/2009 | Thompson et al. | 705/1.1 |
| 7,725,406 | B2 | 5/2010 | Black et al. | |
| 7,895,092 | B2 | 2/2011 | Amling et al. | |
| 2001/0027463 | A1 | 10/2001 | Kobayashi | |

(Continued)

FOREIGN PATENT DOCUMENTS

| | | |
|---|---|---|
| EP | 1 460 570 A1 | 9/2004 |
| WO | 99/34272 A2 | 7/1999 |

OTHER PUBLICATIONS

Dutycalc Data Systems, "Drawback.net 2007", 2007, available at http://dutycalc.com/dnld/archived_dnlds_2007brochures/dutycalc-mainbrochureDRAWBACK.NET2007.pdf.*

(Continued)

*Primary Examiner* — Ryan Zeender
*Assistant Examiner* — Allen Chein
(74) *Attorney, Agent, or Firm* — Buckley, Maschoff & Talwalkar LLC

(57) ABSTRACT

According to some embodiments, a system, a method and/or a computer readable medium are provided. According to some embodiments, a method includes receiving, by a processor, data indicative of a plurality of imported components, each one of the plurality of imported components being subject to an import duty if a respective condition associated with the imported component is not satisfied; maintaining, by a processor, data indicative of ones of the plurality of imported components for which the respective condition has not been satisfied; wherein the maintaining data indicative of ones of the plurality of imported components for which the respective condition has not been satisfied comprises: providing data indicative of ones of the plurality of imported components for which the respective condition has not been satisfied; and updating the data indicative of ones of the plurality of imported components for which the respective condition has not been satisfied; and after the maintaining data indicative of ones of the plurality of imported components for which the respective condition has not been satisfied, determining, by a processor, a respective duty owed for each of the ones of the plurality of imported components for which the respective condition has not been satisfied.

29 Claims, 23 Drawing Sheets

(56) References Cited

U.S. PATENT DOCUMENTS

| | | | |
|---|---|---|---|
| 2001/0051913 A1* | 12/2001 | Vashistha et al. | 705/37 |
| 2003/0004735 A1 | 1/2003 | Dutta et al. | |
| 2003/0069831 A1* | 4/2003 | Le et al. | 705/37 |
| 2003/0144863 A1 | 7/2003 | Liu | |
| 2003/0191652 A1 | 10/2003 | Li et al. | |
| 2004/0193435 A1 | 9/2004 | Fang | |
| 2005/0004894 A1 | 1/2005 | Uy et al. | |
| 2005/0182650 A1 | 8/2005 | Maddox, Jr. et al. | |
| 2005/0222853 A1 | 10/2005 | Black et al. | |
| 2006/0085201 A1 | 4/2006 | Sultan | |
| 2006/0241985 A1 | 10/2006 | Arnold et al. | |
| 2008/0114643 A1 | 5/2008 | Milovina-Meyer et al. | |
| 2009/0168607 A1* | 7/2009 | Liu et al. | 368/10 |

OTHER PUBLICATIONS

"Inward Processing, Guidelines for Traders", Jul. 2008, available at http://www.revenue.ie/en/customs/leaflets/ip-guidelines2008.pdf.*

EUR-Lex-31993R2454-EN, "Commission Regulation (EEC) No. 2454/93 of Jul. 2, 1993 laying down provisions for the implementation of Council Regulation (EEC) No. 2913/92 establishing the Community Customs Code", Official Journal L 253, Nov. 10, 1993, retrieved Oct. 17, 2011, download from http:eur-lex.europa.eu/LexUriServ/LexUriServ.do? uri=CELEX:31993R2454:EN:HTML, (pp. 1-228, 228 pages total).

Luc De Wulf and Jose B. Sokol, "Customs Modernization Handbook", 2005, Copyright 2005 The International Bank for Reconstruction and Development / The World Bank, (cover 1 + pp. 215-241, 29 pages total).

Commission, Guidelines concerning Title III 'Customs procedures with economic impact' of Commission Regulation (EEC) No. 2454/93 of Jul. 2, 1993 laying down provisions of the implementation of Council Regulation (EEC) No. 2913/92 establishing the Community Customs Code, Sep. 24, 2001, Official Journal of the European Communities, 2001/C 269/1-50 ISSN: 0378-6986, 50 pages.

EUR-Lex-31992R2913, "Council Regulation (EEC) No. 2913/92 of Oct. 12, 1992 establishing the Community Customs Code", Official Journal L 302, Oct. 19, 1992, retrieved Oct. 17, 2011, download from http://eur-lex-europa.eu/LexUriServ/LexUriServ.do?uri=CELEX:31992R2913:EN:HTML, (pp. 1-56, 56 pages total).

"Customs Procedures with Economic Impact", Mar. 14, 2007, retrieved Oct. 27, 2011, retrieved from http://help.sap.com/saphelp_gts71/helpdata/en/0b/333a426ea5b26be10000000a155106/content.h, 3pgs.

* cited by examiner

| IP CALCULATION REPORT | | | | | | | | | |
|---|---|---|---|---|---|---|---|---|---|
| NO. | AUTHORIZATION NO. | | STARTING FROM | TO | | | | | |
| IP IMPORTATION NO. | TARIC NO. | QUANTITY | IP EXPORT QUANTITY | | | | | | |
| | | | IP EXPORT QUANTITY | | | | | | |
| | | | | OPEN QUANTITY | DUTIES | COMP INTEREST | | | |

METHODS, APPARATUS, SYSTEMS AND COMPUTER READABLE MEDIUMS FOR USE IN ASSOCIATION WITH DETERMINATION OF CUSTOMS DUTIES

FIELD

Some embodiments of the present invention relate to systems, methods and/or computer readable mediums for use in determining duties owed on components. In particular, some embodiments relate to systems, methods, apparatus and/or computer readable mediums for use in determining import duties owed on components imported into a trade territory.

BACKGROUND

A duty is often owed on components imported into a trade territory (e.g., a territory of, and/or within, a country or group of countries).

For some trade territories, the import duty is deferred and reduced (possibly to zero, i.e., waived) if a condition (which may be defined by one or more laws) is satisfied prior to the end of a predetermined period of time (i.e., a deadline) after the component is imported. For example, for some trade territories, the duty may be deferred and reduced (possibly to zero, i.e., waived) for any components that are incorporated into a product that is exported from the trade territory prior to the deadline. See for example, a provision referred to as inward processing as defined by Article 114-129 ZK and Article 536-550 ZK-DVO of European Customs Law. The duty may also or alternatively be deferred and reduced for any components that are incorporated, prior to the deadline, into a product having a classification that falls within a predetermined group of classifications, e.g., tractors. See for example, a provision referred to as processing under customs control as defined by European Customs Law. The duty may also or alternatively be deferred and reduced for any components that are scrapped prior to the deadline.

The opportunity for deferral and reduction of duties provides economic benefits to entities that import components. In view of this, entities often wait until after the deadline to determine whether a duty is owed on any components that have been imported. At that point, it is customary to determine the components for which the duty is not reduced, and to then determine the duty owed on such components.

BRIEF DESCRIPTION OF THE DRAWINGS

FIG. 3C is a diagram that illustrates a report, according to some embodiments.

FIGS. 7A-7G are diagrams that illustrate views in a graphical user interface, according to some embodiments.

DETAILED DESCRIPTION

Notwithstanding the economic benefits provided by deferral and reduction (possibly to zero, i.e., waiver) of duties, the process of determining the components for which the condition for reduction of duties was not satisfied may require a significant amount of processing time and/or resources.

It has been determined that advantages may be provided by maintaining (i.e., providing and updating over time) data indicative of ones of the components for which the condition has not been satisfied. By maintaining such data, some or all of the processing required to determine the ones of the components for which the condition was not satisfied will be performed in advance of when such determination is needed. Consequently, less processing time and/or resources may be required when it is actually desired to determine the duties owed. In some embodiments, some or all of the processing involved in maintaining the data is performed at times (e.g., nights) at which there is minimum (and/or less than maximum) competition for processing time and/or resources, so as to minimize (and/or at least reduce) the impact of such processing on other processes to be performed.

In some embodiments, the data comprises a set of records that are associated with a manufacturing facility and usable in identifying components that have been imported for use in association with the manufacturing facility and for which a duty is owed.

Figure 1:
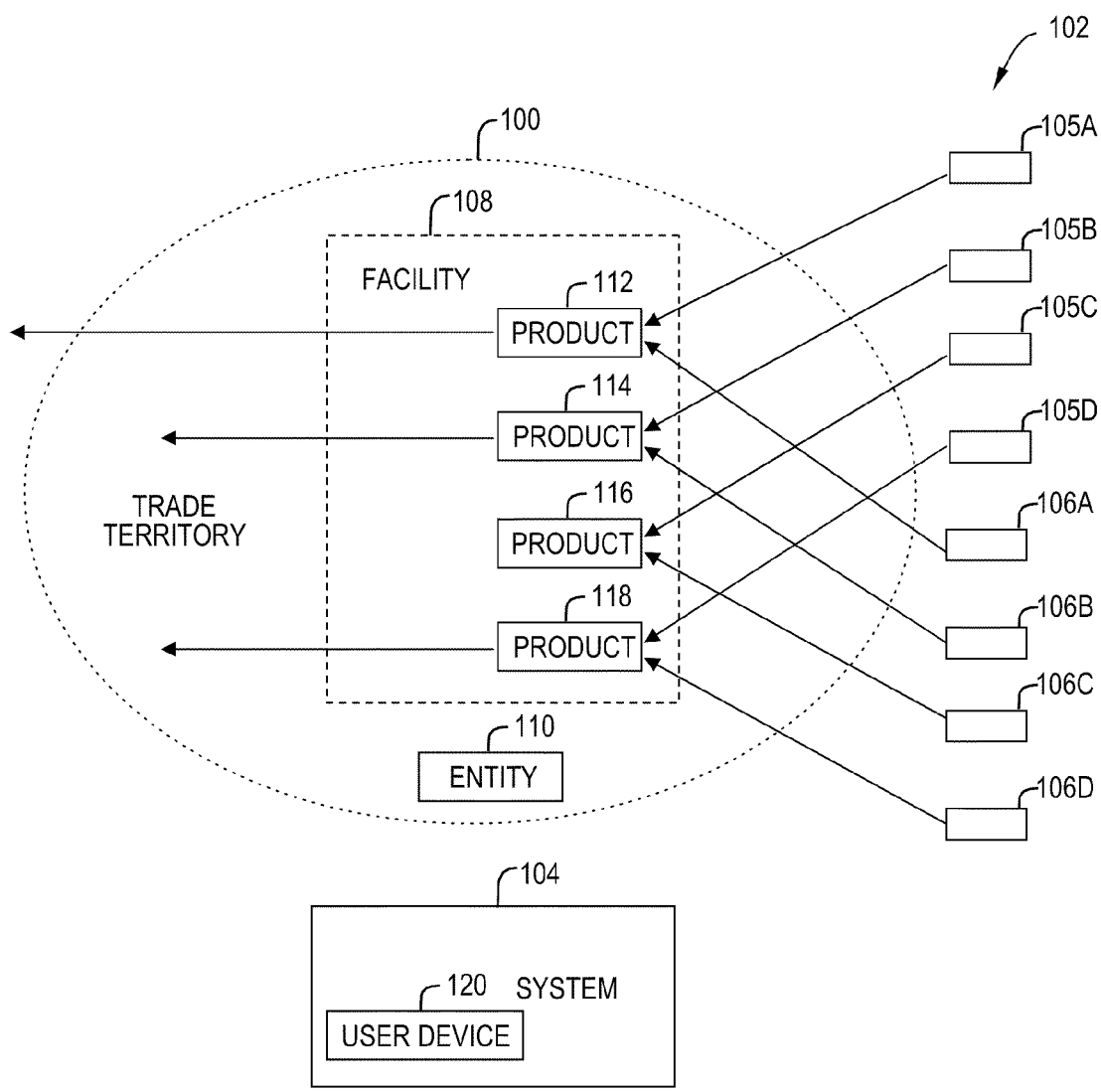
FIG. 1 is a schematic block diagram of a trade territory into which components are imported, and a system that may be used in determining duties owed on the components, according to some embodiments.

FIG. 1 is a schematic block diagram of a trade territory 100 into which a plurality of components 102 are imported and a system 104 that may be used in determining duties owed on the components 102, in accordance with some embodiments. The trade territory 100 may comprise any type of trade territory. In some embodiments, the trade territory 100 comprises a territory within a country (e.g., the Hong Kong special administrative region of the People's Republic of China). In some embodiments, the trade territory 100 comprises some and/or all territory of a single country (e.g., the United States of America). In some other embodiments, the trade territory 100 comprises some or all territory of a plurality of countries (e.g., the European Union).

The plurality of components 102 may comprise any type(s) of component(s). In some embodiments, the plurality of components 102 comprise two or more different types of components, such as for example, components of a first type, represented by components 105A-105D, and components of a second type, represented by components 106A-106D.

After being imported into the trade territory 100, the plurality of components 102 may be delivered to a manufacturing facility 108. The manufacturing facility 108 may comprise any type of manufacturing facility 108 and may be owned, operated and/or otherwise associated with an entity 110. The manufacturing facility 108 may produce products, such as for example, a first product 112, a second product 114, a third product 116 and a fourth product 118. In some embodiments, one or more of the products, e.g., the first product 112, may be exported from the trade territory 100. In some embodiments, one or more of the products, e.g., the second product 114, may have a classification that falls within a predetermined group of classifications, e.g., tractors. In some embodiments, one or more of the products, e.g., the third product 116, may be scrapped. In some embodiments, one or more of the products, e.g., the fourth product 118, may not have any of the above characteristics and may be put into free circulation within the trade territory 100.

One or more of the components imported into the trade territory 100 may be incorporated into one or more of the products produced by the manufacturing facility 108. In the illustrated embodiment, for example, one of the components 105A-105D and one of the components 106A-106D are incorporated into each of the products 112-118.

A duty is often owed on a component imported into a trade territory 100. However, the duty may deferred and reduced (possibly to zero, i.e., waived) if a condition (which may be defined by one or more laws) is satisfied prior to the end of a predetermined period of time (i.e., a deadline) after the component is imported. In some embodiments, the duty may be deferred and reduced if the component is incorporated into a product that is exported from the trade territory prior to the deadline. See for example, a provision referred to as inward processing as defined by Article 114-129 ZK and Article 536-550 ZK-DVO of European Customs Law. In some embodiments, the duty may be deferred and reduced if the component is incorporated, prior to the deadline, into a product having a classification that falls within a predetermined group of classifications, e.g., tractors. See for example, a provision referred to as processing under customs control as defined by European Customs Law. In some embodiments, the duty is deferred and reduced if the component is scrapped prior to the deadline.

The system 104 may comprise any type(s) of system and may be disposed inside and/or outside of the manufacturing facility 108 and/or trade territory 100. In some embodiments, the system 104 (or portion(s) thereof) has an architecture that is the same as and/or similar to the architecture of apparatus 900 (or portion(s) thereof) of FIG. 9. In some embodiments, the system 104 may be owned, operated and/or otherwise associated with the entity 110.

As stated above, the system 104 may be used in determining duties owed on the components 102 imported into the trade territory 100. In some embodiments, this includes determining duties owed on ones of the plurality of components for which a condition for duty reduction has not been satisfied. In some embodiments, the system is also used in determining duties that may be owed on ones of the plurality of components for which a condition for duty reduction has been satisfied but for which the duty is not reduced to zero, i.e., waived.

In some embodiments, the system 104 includes a user device 120, such as, for example, a PC, workstation, set-top device, or mobile computer. The user device 120 may, for example, transmit and/or receive data such as text, graphics, videos, audio content, and/or tabular content from one or more sources within the system 104 and/or external to the system 104. The user device 120 may be located in proximity with and/or remote from one or more other portions of the system 104.

In some embodiments, the user device 120 includes a display screen (or other output device) and a mouse (or other input device) (none of which is separately shown) to allow the user device to provide data to and/or receive data from a user. In some embodiments, the user device 120 executes a browser program to transmit and/or receive data via a computer network, e.g., the Internet. In some embodiments, the user device 120 (or portion(s) thereof) has an architecture that is the same as and/or similar to the architecture of apparatus 900 (or portion(s) thereof) of FIG. 9.

Figure 2:
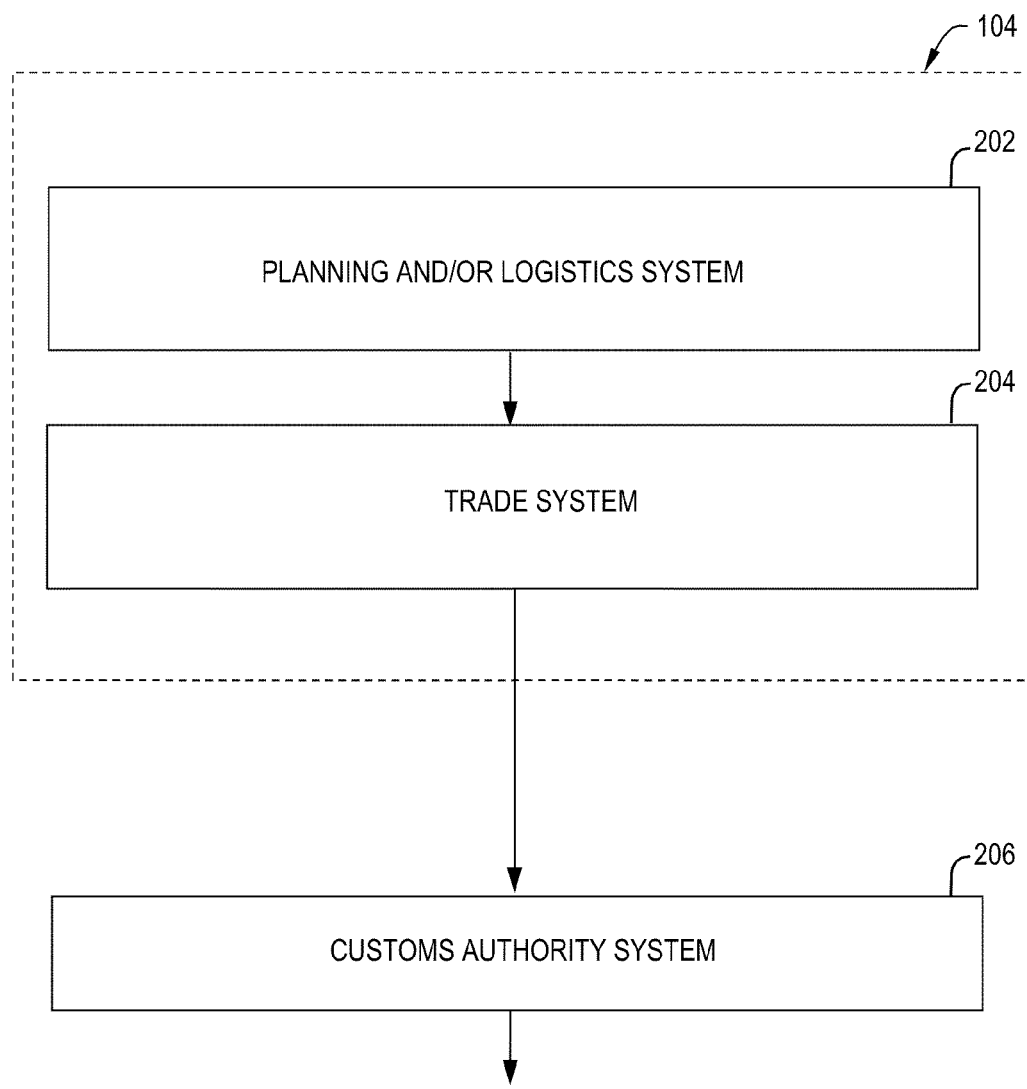
FIG. 2 is a schematic block diagram of a system that may be used in determining duties owed on the components, according to some embodiments.

FIG. 2 is a schematic block diagram of the system 104, according to some embodiments. Referring to FIG. 2, the system 104 may comprise a planning and/or logistics system 202 and a trade system 204. In some embodiments, the planning and/or logistics system 202 comprises an enterprise resource planning (ERP) system, for example an ERP system provided by SAP AG headquartered in Walldorf, Germany. In some embodiments, the planning and/or logistics system 202 (or portion(s) thereof) has an architecture that is the same as and/or similar to the architecture of apparatus 900 (or portion(s) thereof) of FIG. 9.

The trade system 204 may comprise a Global Trade System (GTS), such as for example, SAP BusinessObjects GTS 8.0, also provided by SAP AG. In some embodiments, the functions of the trade system 204 are part of an enterprise resource planning, supply chain management, transportation management, or trade regulation compliance system, service or software. In some embodiments, the trade system 204 (or portion(s) thereof) has an architecture that is the same as and/or similar to the architecture of apparatus 900 (or portion(s) thereof) of FIG. 9.

In some embodiments, the system 104 communicates with a customs authority system 206 operated by and/or associated with a customs authority of the trade territory.

Figure 3A:
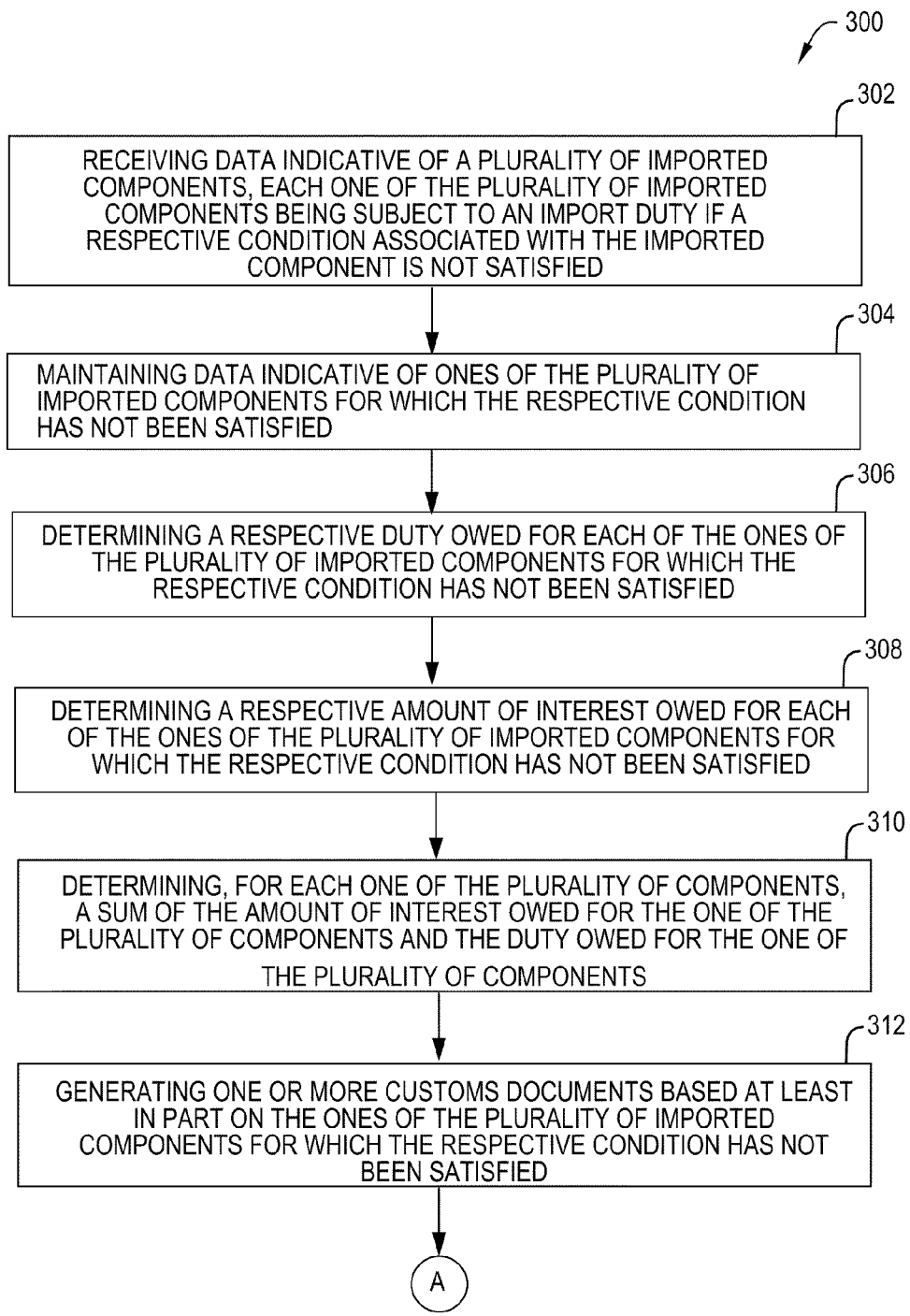
FIGS. 3A-3B are flow charts that illustrate a method according to some embodiments.
Figure 3B:
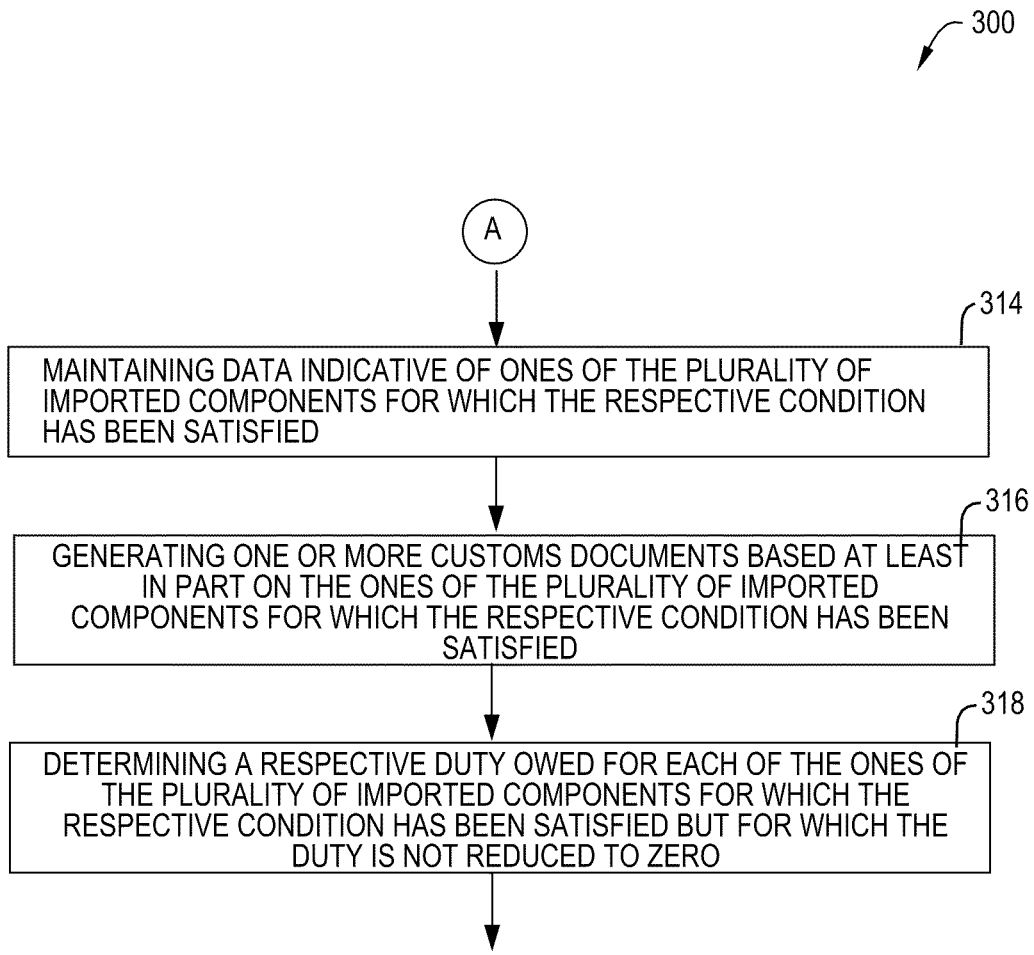

FIGS. 3A-3B are flow charts that illustrate a method 300 according to some embodiments. In some embodiments, the method 300, or one or more portions thereof, may be performed by the system 104, or one or more portions thereof, and/or by one or more other systems. For that matter, unless stated otherwise, any method disclosed herein, or one or more portions thereof, may be performed by the system 104, or one or more portions thereof, and/or by one or more other systems.

In accordance with some embodiments, the method 300 may be used in determining a respective duty owed for ones of a plurality of imported components for which a respective condition for reduction has not been satisfied.

The method 300 is not limited to the order shown in the flow chart. Rather, embodiments of the method 300 may be performed in any order that is practicable. For that matter, unless stated otherwise, any method disclosed herein may be performed in any order that is practicable.

Referring to FIGS. 3A-3B, at 302, the method may include receiving data indicative of a plurality of imported components, each one of the plurality of imported components being subject to an import duty if a respective condition associated with the imported component is not satisfied.

In some embodiments, the data indicative of a plurality of imported components comprises data indicative of a plurality of components imported into a trade territory.

In some embodiments, each one of the plurality of components is associated with a respective deadline to satisfy the respective condition associated with the one of the plurality of components. In some embodiments, for each one of the plurality of components, the condition associated with the one of the plurality of components is satisfied if, prior to the respective deadline to satisfy the respective condition associated with the one of the plurality of components, the one of the plurality of components has been: (i) incorporated into a product that has been exported from the trade territory, (ii) incorporated into a product having a classification that falls within a predetermined group of classifications or (iii) scrapped.

At 304, the method may further include maintaining data indicative of ones of the plurality of imported components for which the respective condition has not been satisfied. In some embodiments, this includes (i) providing data indicative of ones of the plurality of imported components for which the respective condition has not been satisfied, and (ii) updating the data indicative of ones of the plurality of imported components for which the respective condition has not been satisfied.

In some embodiments the maintaining of the data is based at least in part on a first in first out (FIFO) rule.

In some embodiments, the updating the data indicative of ones of the plurality of imported components for which the respective condition has not been satisfied comprises updating the data at least once prior to the respective deadline for each one of the plurality of components, updating, at least monthly, the data indicative of ones of the plurality of imported components for which the respective condition has not been satisfied and/or periodically updating the data indicative of ones of the plurality of imported components for which the respective condition has not been satisfied.

In some embodiments, periodically updating of the data indicative of ones of the plurality of imported components for which the respective condition has not been satisfied comprise updating the data at a first frequency (e.g., daily, and/or weekly).

In some embodiments, some or all of the processing involved in maintaining the data is performed at times (e.g., nights) at which there is minimum (and/or less than maximum) competition for processing time and/or resources, so as to minimize (and/or at least reduce) the impact of such processing on other processes to be performed.

At 306, the method may further include determining a respective duty owed for each of the ones of the plurality of imported components for which the respective condition has not been satisfied. In some embodiments, the determination is based at least in part on the data indicative of the ones of the plurality of imported components for which the respective condition has not been satisfied and duty rates associated with such components.

In some trade territories, interest may also be owed. In some embodiments, for example, if the condition associated with a component is not satisfied, a due date for a duty owed on the component may revert back to the date that the component was first imported.

In that regard, at 308, the method may further include determining a respective amount of interest owed for each of the ones of the plurality of imported components for which the respective condition has not been satisfied.

At 310, the method may further include determining, for each one of the plurality of components, a sum of the amount of interest owed for the one of the plurality of components and the duty owed for the one of the plurality of components.

At 312, the method may further include generating one or more customs reports based at least in part on the data indicative of the ones of the plurality of imported components for which the respective condition has not been satisfied.

FIG. 3C is a diagram that illustrates one embodiment of a customs report, according to some embodiments.

At 314, the method may further include maintaining data indicative of ones of the plurality of imported components for which the respective condition has been satisfied. In some embodiments, this includes (i) providing data indicative of ones of the plurality of imported components for which the respective condition has been satisfied, and (ii) updating the data indicative of ones of the plurality of imported components for which the respective condition has been satisfied.

At 316, the method may further include generating one or more customs reports based at least in part on the data indicative of the ones of the plurality of imported components for which the respective condition has been satisfied.

At 318, the method may further include determining a respective duty owed for ones of the plurality of imported components for which the respective condition has been satisfied but for which the duty is not reduced to zero, i.e., waived. In some embodiments, the determination is based at least in part on the data indicative of the ones of the plurality of imported components for which the respective condition has been satisfied and duty rates associated with components for which the respective condition has been satisfied.

In some embodiments, the determining of the respective duty owed for each of the ones of the plurality of imported components for which the respective condition has not been satisfied comprises determine the respective duty at a second frequency (e.g., weekly and/or monthly).

In some embodiments, the updating the data indicative of ones of the plurality of imported components for which the respective condition has not been satisfied is performed at a first frequency (e.g., daily or weekly) and the determining of the respective duty owed for each of the ones of the plurality of imported components for which the respective condition has not been satisfied comprises determine the respective duty at a second frequency (e.g., weekly and/or monthly) that is less than the first frequency.

As stated above, advantages may be provided by maintaining (i.e., providing and updating over time) data indicative of ones of the components for which the condition has not been satisfied. By maintaining such data, some or all of the processing required to determine the ones of the components for which the condition was not satisfied will be performed in advance of when such determination is needed. Consequently, less processing time and/or resources may be required when it is actually desired to determine the duties owed.

In some embodiments, the data comprises a set of records that are associated with a manufacturing facility and usable in identifying components that have been imported for use in association with the manufacturing facility and for which a duty is owed.

Figure 4:
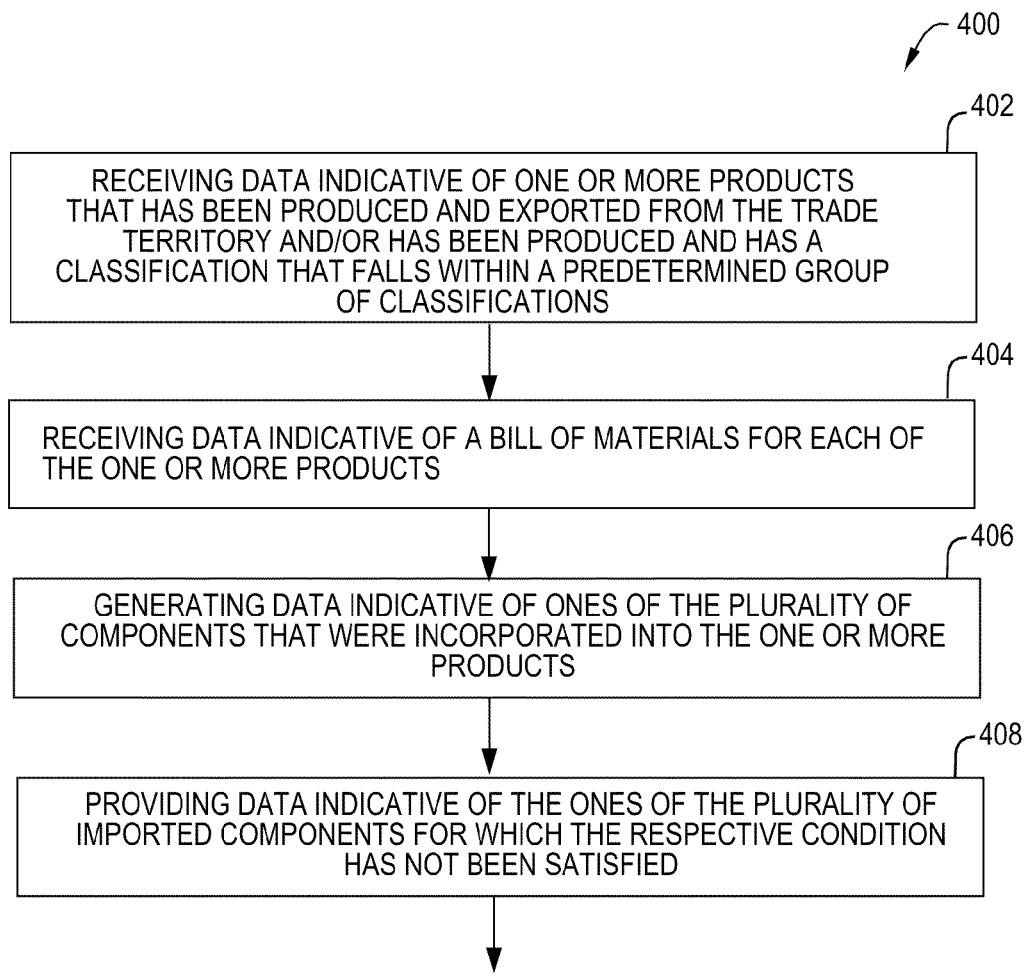
FIG. 4 is a flow chart that illustrates a method according to some embodiments.

FIG. 4 is a flow chart that illustrates a method 400 according to some embodiments. In some embodiments, the method 400, or one or more portions thereof, may be used at 304 of method 300 (FIGS. 3A-3B) in providing data indicative of ones of the plurality of imported components for which the respective condition has not been satisfied.

Referring to FIG. 4, at 402 the method may include receiving data indicative of one or more products that has been produced and exported from the trade territory and/or has been produced and has a classification that falls within a predetermined group of classifications that would result in reduction of import duties for components incorporated therein.

At 404, the method may further include receiving data indicative of a bill of materials for each of the one or more products that has been produced and exported from the trade territory and/or has been produced and has a classification that falls within a predetermined group of classifications that would result in reduction of import duties for components incorporated therein.

At 406, the method may further include generating data indicative of ones of the plurality of components that were incorporated into the one or more products. In some embodiments, such data may be generated based at least in part on the data indicative of the plurality of imported components, the data indicative of the one or more products that has been produced and exported from the trade territory and/or has been produced and has a classification that falls within a predetermined group of classifications that would result in reduction of import duties for components incorporated therein, and the data indicative of the bill of materials for each of the one or more products.

At 408, the method may further include providing data indicative of the ones of the plurality of imported components for which the respective condition has not been satisfied. Such data may be based at least in part on the data indicative of the plurality of imported components and the data indicative of ones of the plurality of components that were incorporated into the one or more products that has been produced and exported from the trade territory and/or has been produced and has a classification that falls within a predetermined group of classifications that would result in reduction of import duties for components incorporated therein In some embodiments the providing of the data is based at least in part on a first in first out (FIFO) rule.

Figure 5:
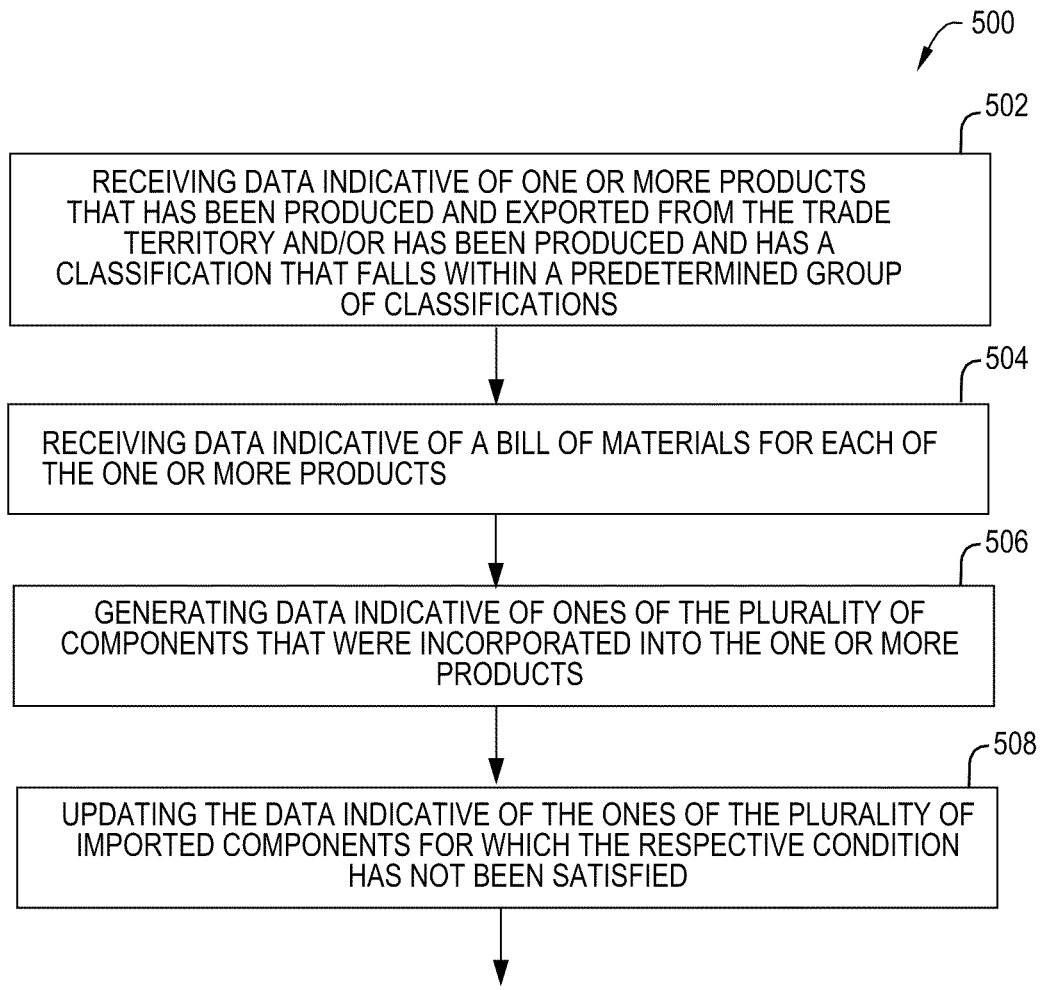
FIG. 5 is a flow chart that illustrates a method according to some embodiments.

FIG. 5 is a flow chart that illustrates a method 500 according to some embodiments. In some embodiments, the method 500, or one or more portions thereof, may be used at 304 of method 300 (FIGS. 3A-3B) in updating data indicative of ones of the plurality of imported components for which the respective condition has not been satisfied.

Referring to FIG. 5, at 502, the method may include receiving data indicative of one or more products that has been produced and exported from the trade territory and/or has been produced and has a classification that falls within a predetermined group of classifications that would result in reduction of import duties for components incorporated therein, since the data indicative of ones of the plurality of imported components for which the respective condition has not been satisfied was provided or last updated, whichever occurred last.

At 504, the method may further include receiving data indicative of a bill of materials for each of the one or more products.

At 506, the method may further include generating data indicative of ones of the plurality of components that were incorporated into the one or more products. Such data may be generated based at least in part on the data indicative of the plurality of imported components, the data indicative of one or more products that has been produced and exported from the trade territory and/or has been produced and has a classification that falls within a predetermined group of classifications that would result in reduction of import duties for components incorporated therein, since the data indicative of ones of the plurality of imported components for which the respective condition has not been satisfied was provided or last updated, whichever occurred last, and the data indicative of the bill of materials for each of the one or more products.

At 508, the method may further include updating the data indicative of the ones of the plurality of imported components for which the respective condition has not been satisfied. The updating may be based at least in part on the data indicative of ones of the plurality of components that were incorporated into the one or more products produced and exported from the trade territory and/or has been produced and has a classification that falls within a predetermined group of classifications that would result in reduction of import duties for components incorporated therein, since the data indicative of ones of the plurality of imported components for which the respective condition has not been satisfied was provided or last updated, whichever occurred last.

In some embodiments the updating of the data is based at least in part on a first in first out (FIFO) rule.

FIGS. 6A-6E are schematic block diagrams illustrating one embodiment of the system 104 and the customs authority system 206 performing portions of a method 800 (FIGS. 8A-8F) described below, one or more portions of which may be used in performing and/or in association with the method 300 of FIGS. 3A-3B, or one or more portions thereof.

In the embodiment illustrated in FIGS. 6A-6E, the planning and/or logistics system 202 portion of the system 104 comprises an enterprise resource planning (ERP) system, for example an ERP system provided by SAP AG headquartered in Walldorf, Germany, and the trade system 204 portion of the system 104 comprises a Global Trade System (GTS), such as for example, SAP BusinessObjects GTS 8.0, also provided by SAP AG. Other embodiments may also be employed.

Figure 6A:
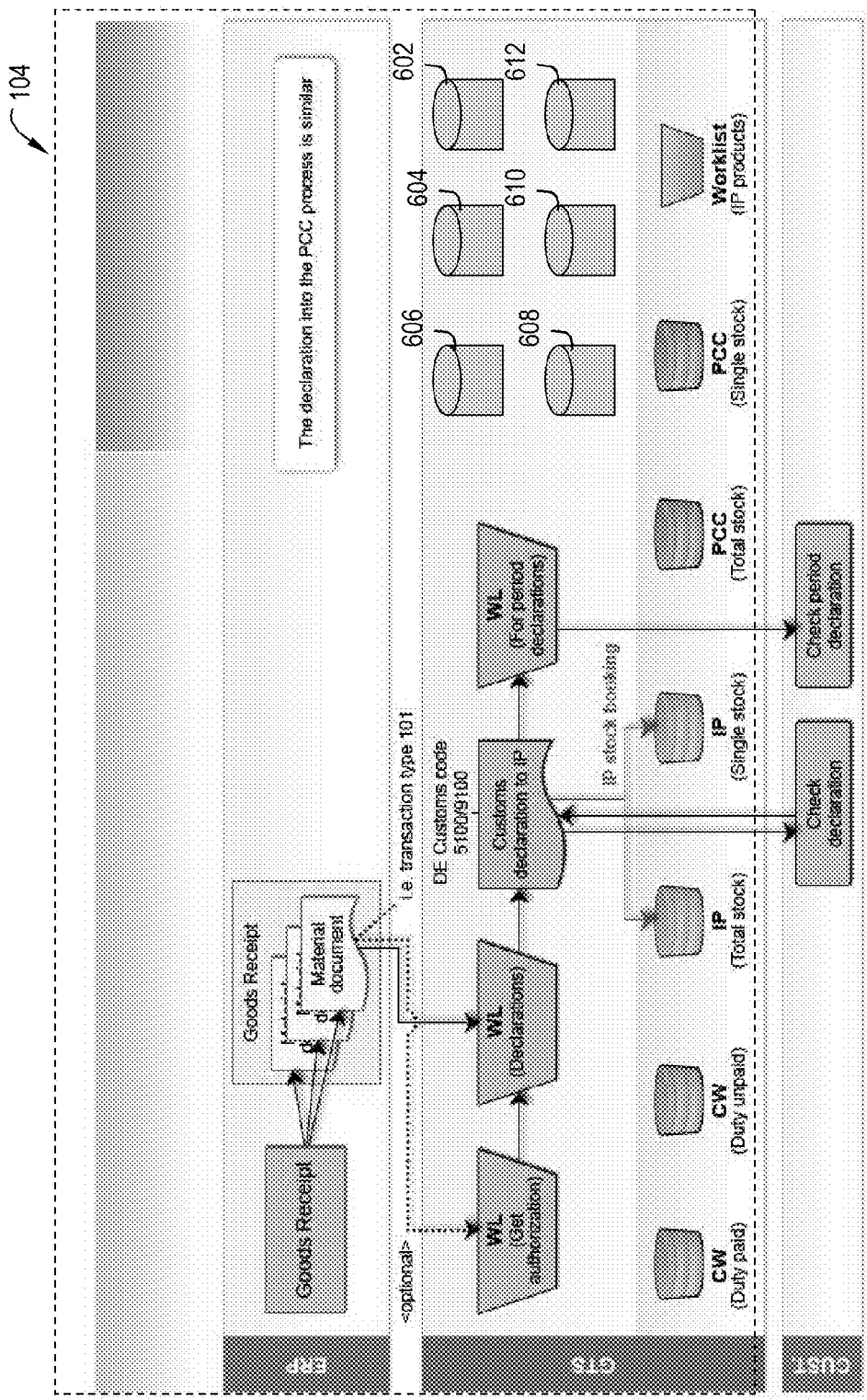
FIGS. 6A-6B are schematic flow diagrams of a system, according to some embodiments.
Figure 6B:
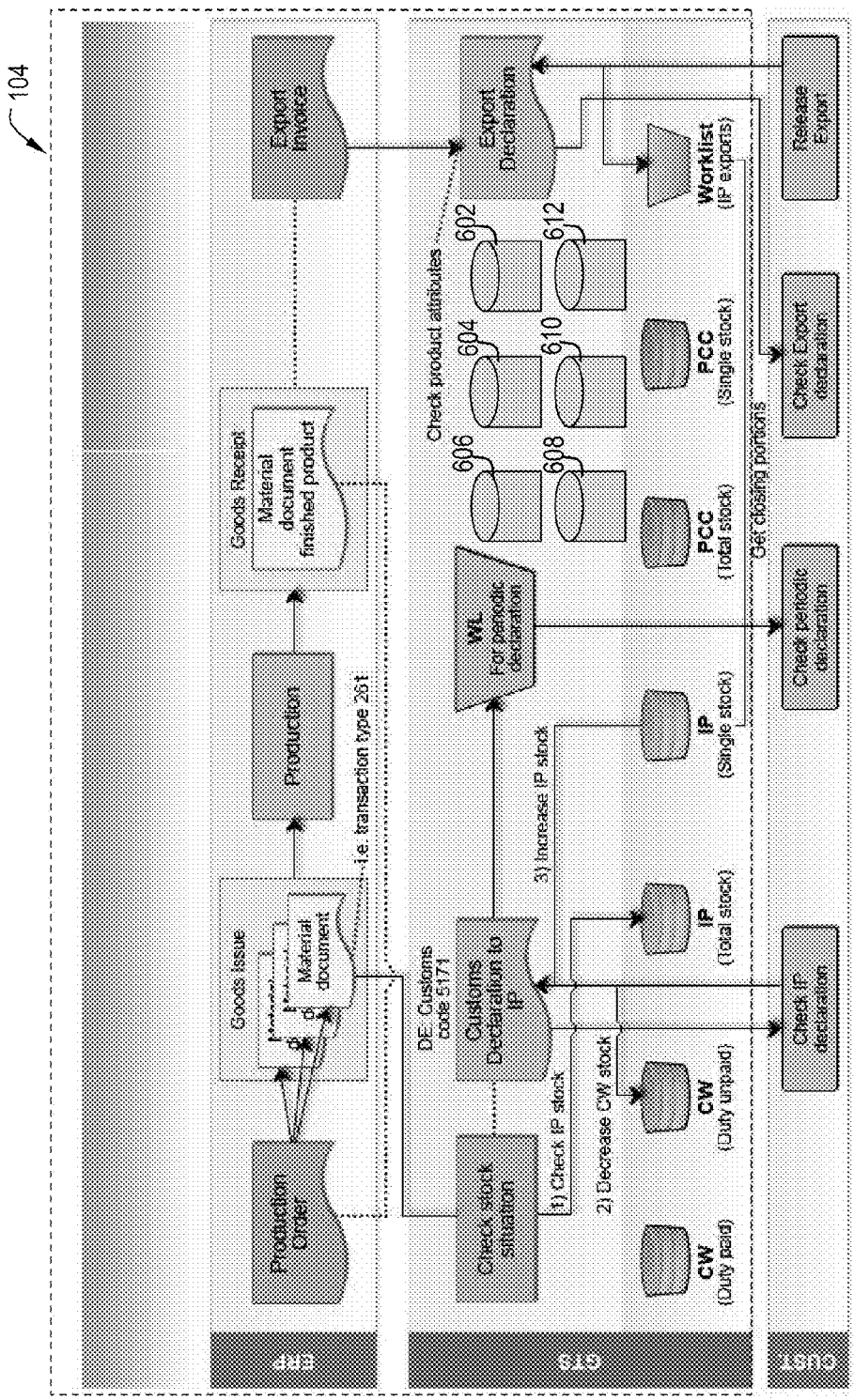

FIGS. 6A-6B are further discussed below with respect to the description of method 800 of FIGS. 8A-8F.

FIGS. 7A-7G are diagrams that illustrate views in a graphical user interface 700 that may be used in the system 104, according to some embodiments. In accordance with some embodiments, the graphical user interface may provide a user with the ability to define and/or change one or more aspects of the operation of the system. In some embodiments, the graphical user interface is used in association with a user device, e.g., user device 120 of FIG. 1.

FIGS. 7A-7G are further discussed below with respect to the description of method 800 of FIGS. 8A-8F.

FIGS. 8A-8E are flow charts that illustrate a method 800 according to some embodiments. In some embodiments, the method 800, or one or more portions thereof, may be used in performing and/or in association with the method 300 of FIGS. 3A-3B, or one or more portions thereof.

As stated above, with respect to the method 300 of FIGS. 3A-3B, an imported component may be subject to an import duty. The duty may be deferred and reduced if a respective condition associated with the component is satisfied prior to a respective deadline associated with the component. The condition may be satisfied if, prior to the respective deadline, the component is: (i) incorporated into a product that has been exported from the trade territory (ii) incorporated into a product having a classification that falls within a predetermined group of classifications or (iii) scrapped.

One example of a provision that provides deferral and reduction of duties if the component is incorporated into a product that has been exported from the trade territory is referred to as inward processing relief (sometimes referred to as IPR), which is defined under European Customs Law.

One example of a provision that provides deferral and reduction of duties if the component is incorporated into a product having a classification that falls within a predetermined group of classifications is referred to as processing under customs control (sometimes referred to as PCC), which is also defined under European Customs Law.

In the description of method 800, reference is often made to inward processing relief and processing under customs control. However, the method 800 is not limited to embodiments that include inward processing relief and/or processing under customs control, as defined under European Customs Law.

Thus, some embodiments of method 800 do not include inward processing relief and/or processing under customs control as defined under European Customs Law.

Rather, some embodiments include a different provision (i.e., a provision other than inward processing relief as defined under European Customs Law) to provide deferral and reduction of duties if the component is incorporated into a product that has been exported from the trade territory.

Likewise, some embodiments include a different provision (i.e., a provision other than processing under customs control as defined under European Customs Law) to provide deferral and reduction of duties if the component is incorporated into a product having a classification that falls within a predetermined group of classifications.

Referring to FIGS. 8A-8F, at 802, the method may include requesting authorization to import components into a trade territory. The request may be transmitted to, and/or otherwise provided to, a customs authority for the trade territory.

In some embodiments, the requested authorization comprises a request for authorization to import the components for free circulation within the trade territory (and not deferring the import duty on each such component).

In some embodiments, the requested authorization comprises a request for authorization to import the components under a provision that provides deferral and/or reduction of import duties. For some trade territories, the duty may be deferred and reduced (possibly to zero, i.e., waived) for any components that are incorporated into a product that is exported from the trade territory prior to the deadline (e.g., inward processing relief). For some trade territories, the duty may also or alternatively be deferred and reduced (possibly to zero, i.e., waived) for any components that are incorporated, prior to the deadline, into a product having a classification that falls within a predetermined group of classifications (e.g., agricultural machinery, tractors) (e.g., processing under customs control).

In some embodiments, the requested authorization comprises a request for authorization to import the components under a provision that provides deferral of import duties without reduction of the import duties (e.g., customs warehousing, sometimes referred to as CW).

In some embodiments, more than one type of authorization may be requested for a component. This may provide a requestor with subsequent options as to how to declare the component for customs purposes. In some embodiments, a separate request is required for each type of authorization or option being requested.

FIG. 6A is schematic flow diagram illustrating one embodiment of the system 104 performing 802 and various subsequent portions of method 800, in accordance with some embodiments. In some embodiments, the system 104 includes one or more databases. In some embodiments, the one or more databases may include a duty paid stock database 602, an IP finished products database 604, a PCC finished products database 606, a bill of materials database 608, a duty rate database 610 and a compensating interest rate database 612. The system 104 may further include one or more other database described hereinbelow.

The one or more databases may have any form. In some embodiments, one, some or all of the databases comprises data stored in one or more tables. In some embodiments, the one or more databases are stored separate from one another. In some other embodiments, two or more of the databases are stored together.

At 804, the method may further include receiving the requested authorization(s). In some embodiments, the requested authorization(s) is/are received from a customs authority for the trade territory.

Figure 7A:
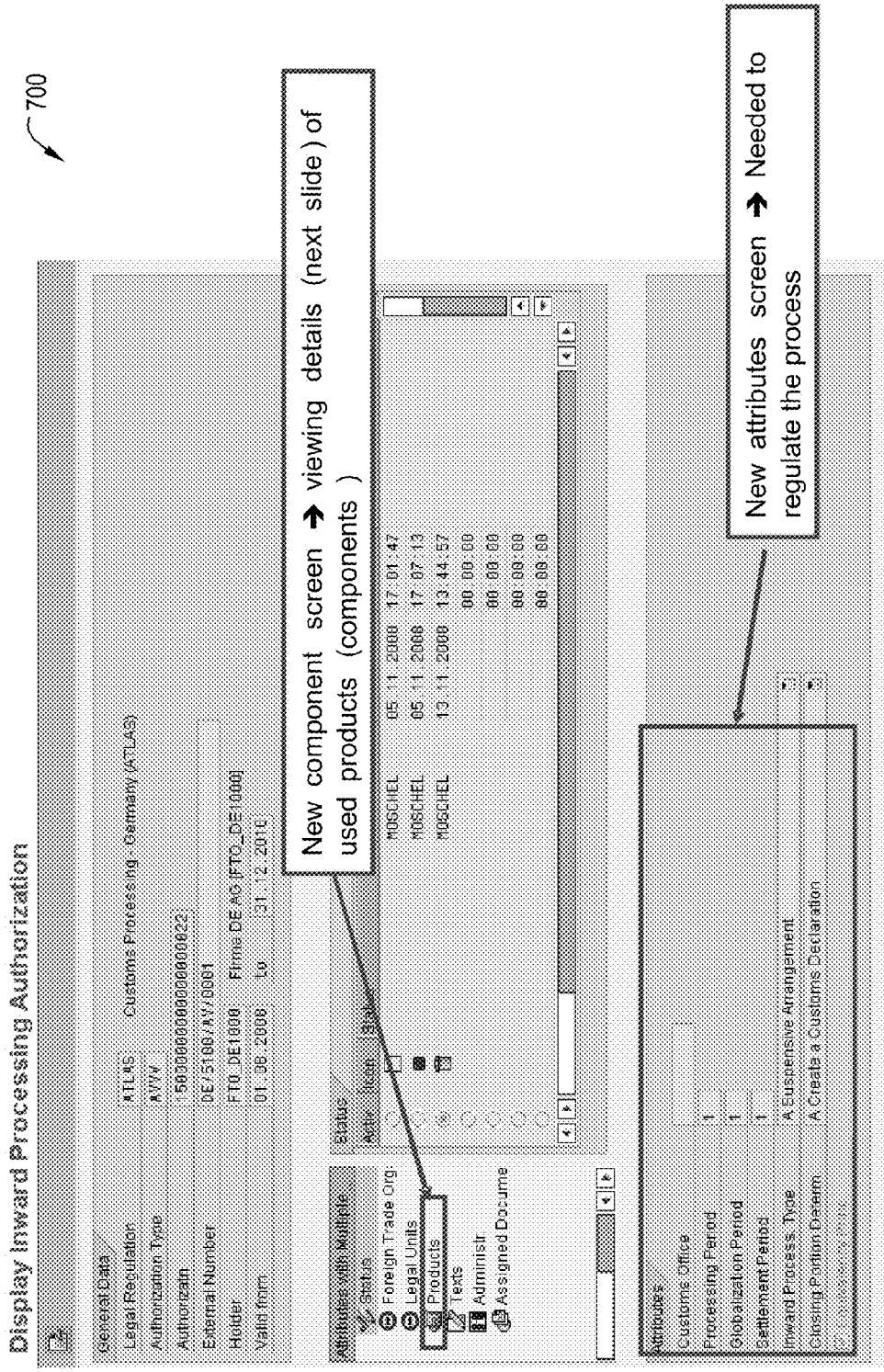
Figure 7B:
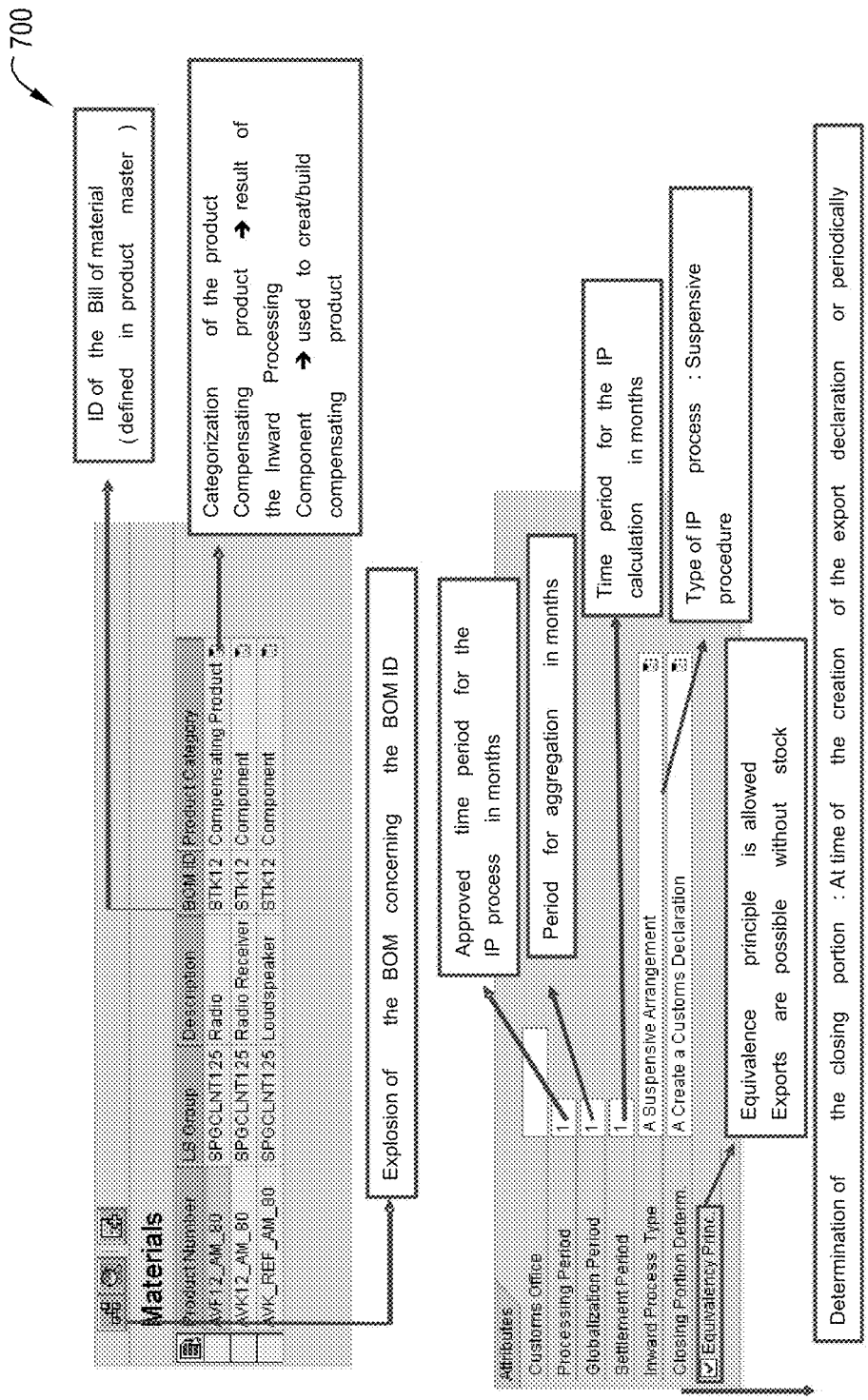

FIGS. 7A-7B illustrate two views in a graphical user interface that may be used in the system 104 to display an authorization.

At 808, the method may further include receiving data indicating that the components have been imported into the trade territory. In some embodiments, the data comprises one or more material documents indicating that the components have been imported and received by a logistics system and/or other portion of a manufacturing facility.

At 810, the method may further include determining how to declare one or more of the imported components to one or more of the authorized options. In some embodiments, this comprises designating one or more of the components to be declared to free circulation (and thereby opting to pay and not defer the import duty on each such component), designating one or more of the components to be declared to a first type of authorization that provides deferral and reduction of duties for any components that are incorporated into a product that is exported from the trade territory prior to the respective deadline (e.g., inward processing relief), designating one or more of the components to be declared to a second type of authorization that provides deferral and reduction of duties for any components that are incorporated (prior to the respective deadline) into a product having a classification that falls within a predetermined group of classifications (e.g., processing under customs control) and/or designating one or more of the components to a provision that provides deferral of import duties without reduction of the import duties (e.g., customs warehouse).

In some embodiments, the latter designation is only a temporary designation as any components so designated must eventually be re-designated to one of the other authorized options. In some embodiments, it may be desirable to designate one or more of the components to such a temporary designation until a more desirable option is determined.

In some embodiments, the designating is performed by a user of the processing system.

At 812, the method may further include receiving data indicative of the determination as to how to declare the one or more of the imported components to the one or more of the authorized options.

At 814, the method may further include generating one or more declarations based at least in part on the data indicative of the determination as to how to declare the one or more of the imported components to the one or more of the authorized options. In some embodiments, a separate declaration is generated for each combination of component type and declaration type. Thus, a first declaration may be generated to declare one or more components of a first type for a first type of declaration (e.g. inward processing relief). A second declaration may be generated to declare one or more components of a second type for the first type of declaration (e.g. inward processing relief). A third declaration may be generated to declare one or more components of the first type for a second type of declaration (e.g., processing under customs control). A fourth declaration may be generated to declare one or more components of the second type for the second type of declaration (e.g., processing under customs control). A fifth declaration may be generated to declare one or more components of the first type for a third type of declaration (e.g., customs warehousing). A sixth declaration may be generated to declare one or more components of the second type for the third type of declaration (e.g., customs warehousing).

Figure 7C:
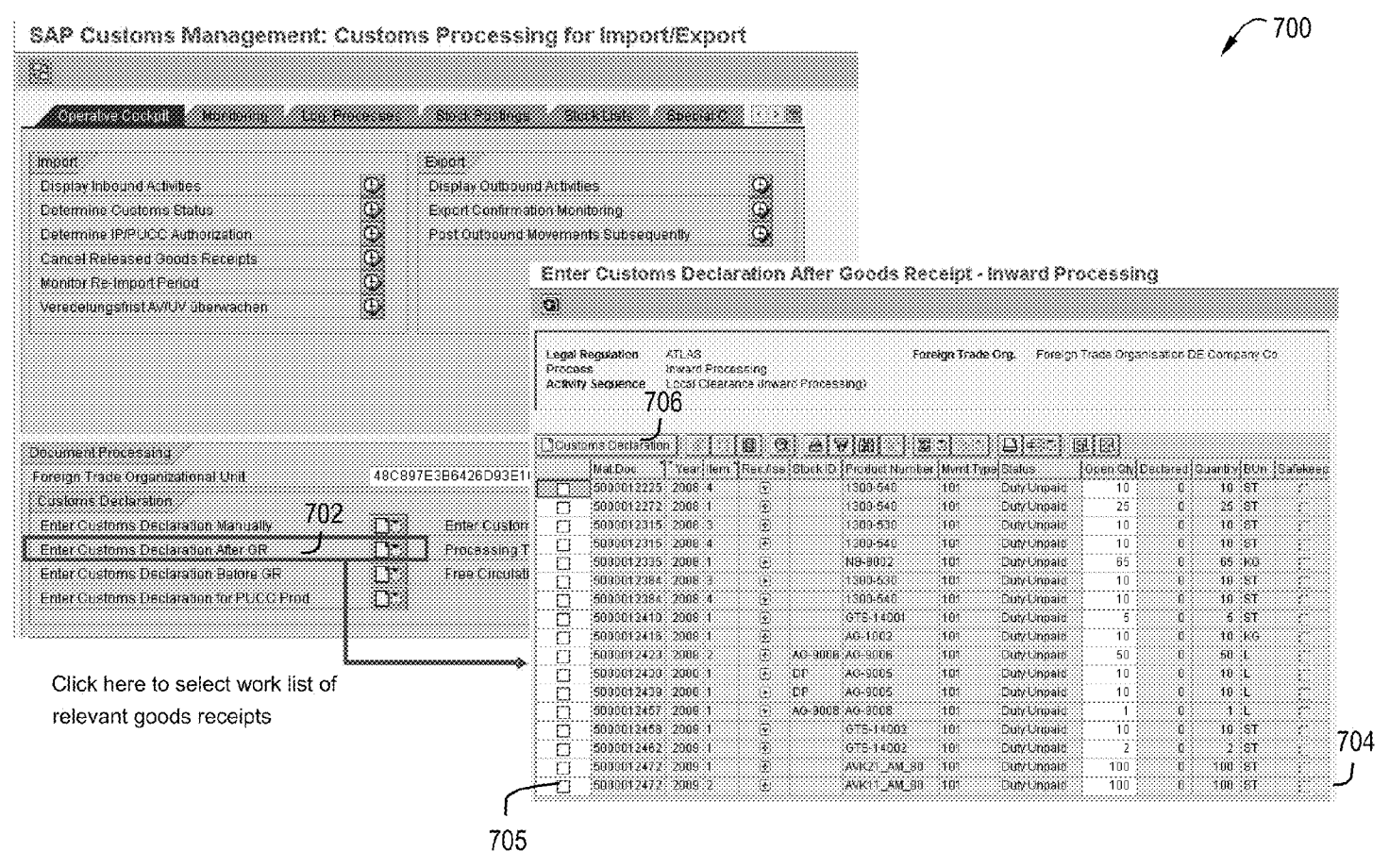
Figure 7D:
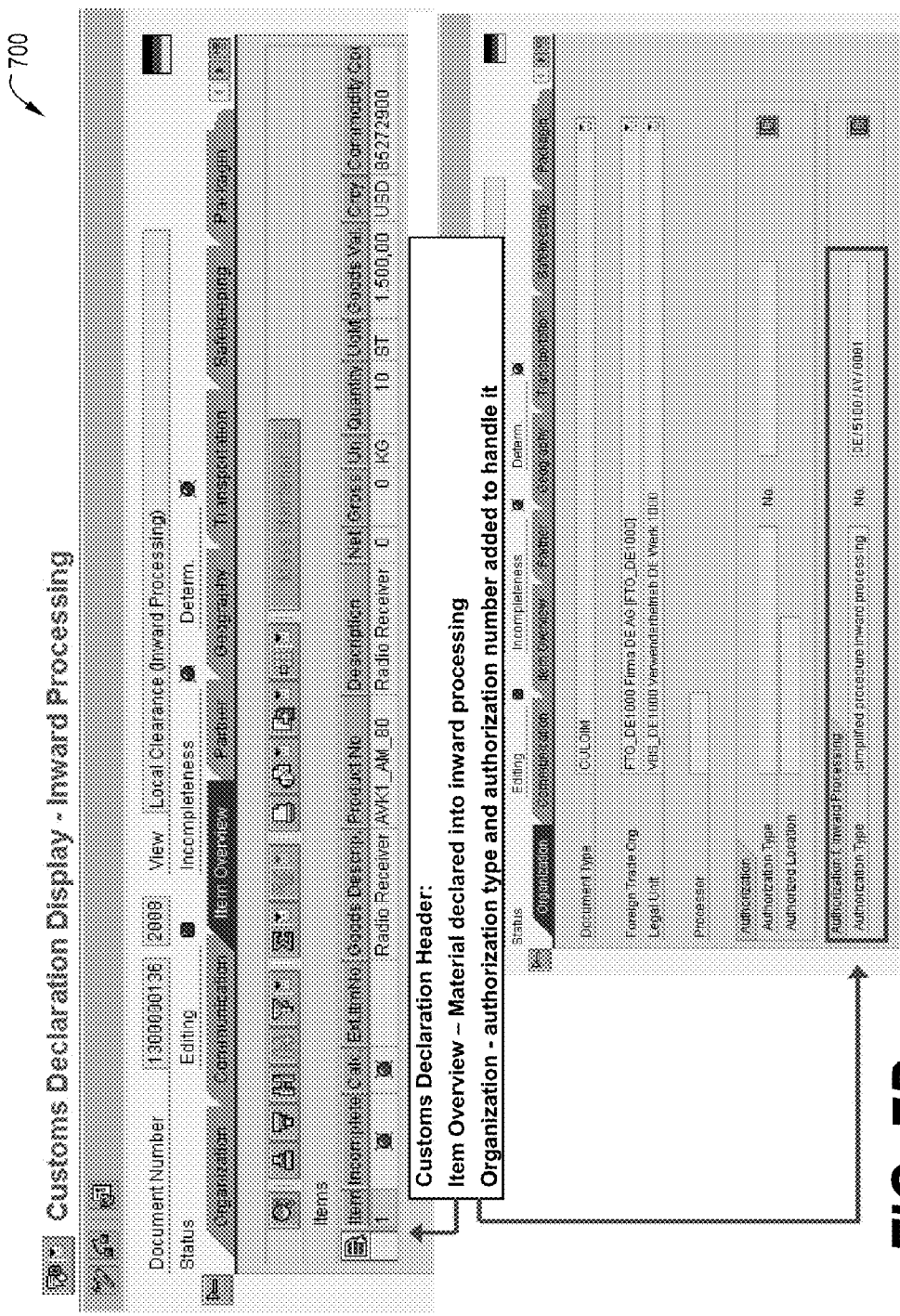
Figure 7E:
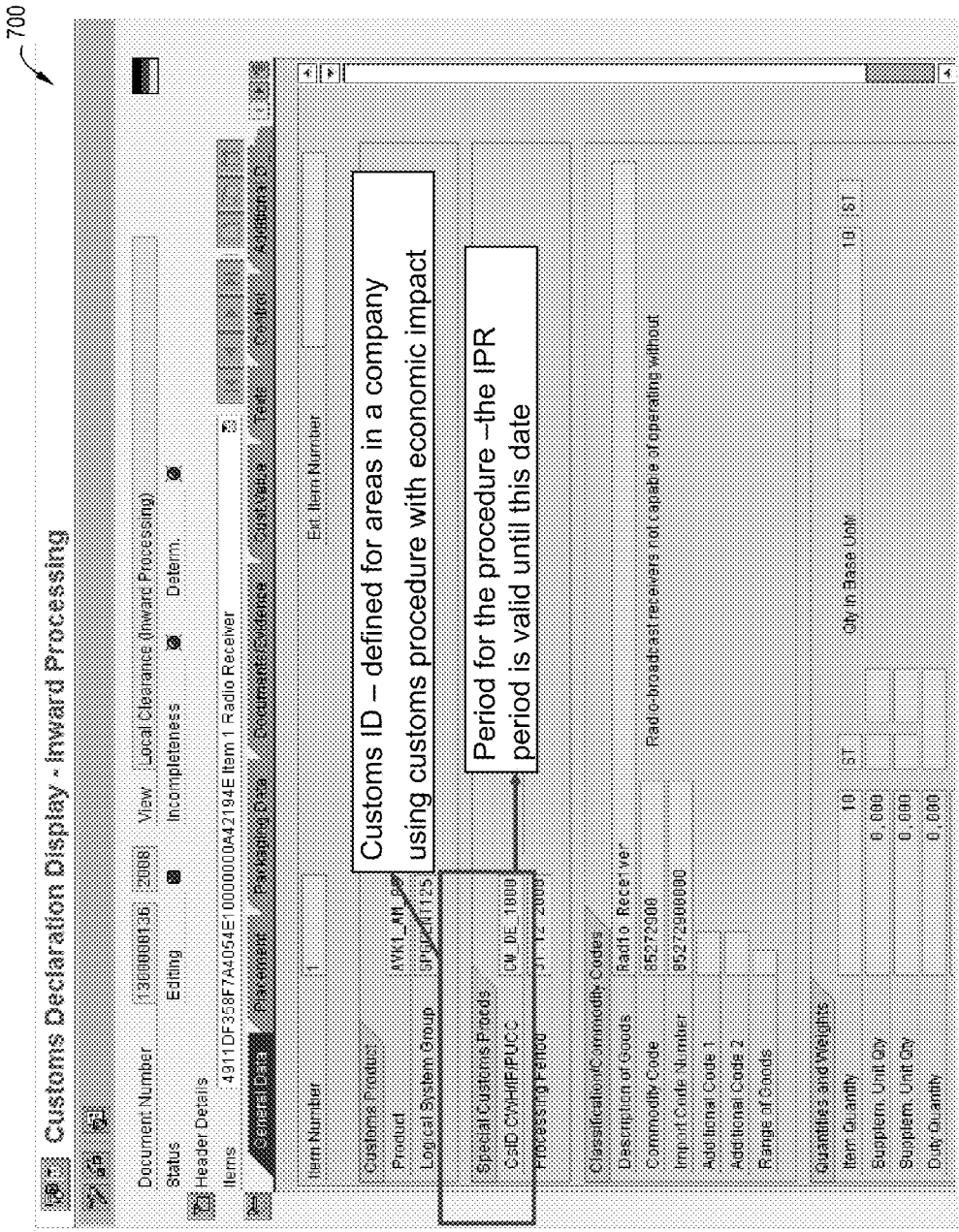

FIG. 7C illustrates two views in a graphical user interface that may be used in the system 104 for use in declaring one or more components for inward processing relief, in accordance with some embodiments. A first view (on left) includes a graphical tool 702 (e.g., a button) to initiate display of the second view (on right). In the second view, a line entry 704 is associated with material document 5000012472 indicating receipt of a component having a product number AVK11_AM_80. Line entry 704 indicates that the total quantity associated with the material document is 100, that the quantity declared for inward processing is 0 and that the quantity open for declaration is 100. A first graphical tool 705, which may comprise a "check box", may be used to indicate that a declaration is desired with respect to one or more of the 100 components. A value in the open quantity column may be changed to specify a quantity that is desired to be declared for inward processing. A second graphical tool 706, which may comprise a button, may be activated to trigger generation of the declaration for the desired quantity of the component. FIG. 7D illustrates a view of a declaration that may be generated using the graphical user interface and the method described with respect to FIG. 7C. FIG. 7E illustrates another view of the declaration that may be generated using the graphical user interface and the method described with respect to FIG. 7C.

At 816, the method may further include transmitting and/or otherwise providing the one or more declarations to the customs authority, which may check the one or more declarations.

At 818, the method may further include generating one or more period declarations based at least in part on the designations of the one or more components.

At 820, the method may further include transmitting and/or otherwise providing the one or more period declarations to the customs authority for the trade territory. The customs authority may check the one or more period declarations.

At 822, the method may further include storing, in one or more databases, data indicative of the one or more declarations. In some embodiments, declarations for a first type of declaration (e.g., inward processing relief) are stored in a first database (e.g., a database represented in FIGS. 6A-6B as IP single stock), declarations for a second type of declaration (e.g., processing under customs control) are stored in a second database (e.g., a database represented in FIGS. 6A-6B as PCC single stock) and declarations for a third type of declaration (e.g., customs warehousing) are stored in a third database (e.g., a database represented in FIGS. 6A-6B as CW duty unpaid).

At 824, the method may further include maintaining data indicative of a total quantity (e.g., stock) of each type of component that is declared for each type of declaration and not yet issued to production for use in a particular product.

In some embodiments, maintaining such data comprises (i) providing data indicative of a total quantity (e.g., stock) of each type of component that is declared for each type of declaration and not yet issued to production for use in a particular product and (ii) updating data indicative of a total quantity (e.g., stock) of each type of component that is declared for each type of declaration and not yet issued to production for use in a particular product.

In some embodiments, the data comprises a plurality of sums, where each sum is associated with a respective combination of component type and declaration type and is indicative of a total quantity (e.g., stock) of the respective component type that has been declared for the respective type of authorization and not yet issued to production for use in a particular product.

For example, a first sum may be associated with a first type of component and a first type of declaration (e.g., inward processing relief) and may be indicative of a total quantity (e.g., stock) of the first type of component that is declared for the first type of declaration and not yet issued to production for use in a particular product.

A second sum may be associated with a second type of component and the first type of declaration (e.g., inward processing relief) and may be indicative of a total quantity (e.g., stock) of the second type of component that is declared for the first type of declaration and not yet issued to production for use in a particular product.

A third sum may be associated with the first type of component and a second type of declaration (e.g., processing under customs control) and may be indicative of a total quantity (e.g., stock) of the first type of component that is declared for the second type of declaration and not yet issued to production for use in a particular product.

A fourth sum may be associated with the second type of component and the second type of declaration (e.g., processing under customs control) and may be indicative of a total quantity (e.g., stock) of the second type of component that is declared for the second type of declaration and not yet issued to production for use in a particular product.

In some embodiments, the portion of the data that indicates totals for components declared for the first type of declaration (e.g., inward processing relief) may be stored in a database (e.g., a database represented in FIGS. 6A-6B as IP total stock). The portion of the data that indicates totals for components declared for the second type of declaration (e.g., processing under customs control) may also be stored in a database (e.g., a database represented in FIGS. 6A-6B as PCC total stock).

At 826, the method may further include receiving a production order and issuing components to a production process in response to the production order.

FIG. 6B is schematic flow diagram illustrating one embodiment of the system 104 performing 826 and various subsequent portions of method 800, in accordance with some embodiments.

At 828, the method may further include receiving data indicating that the components have been issued to the production process.

In some embodiments, the data comprises one or more material documents indicating that the components have been issued to the production process.

At 830, the method may further include determining if the production order is for a product that will be exported from the trade territory.

Figure 7F:
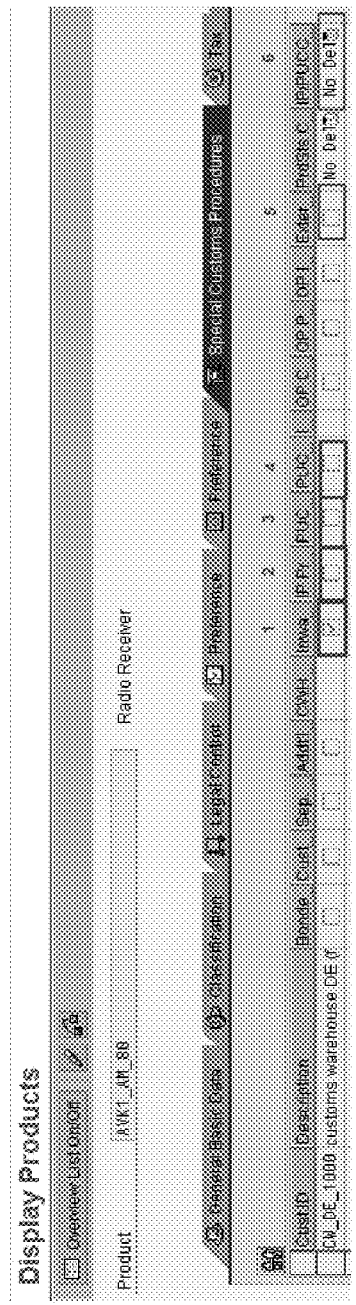
Figure 8A:
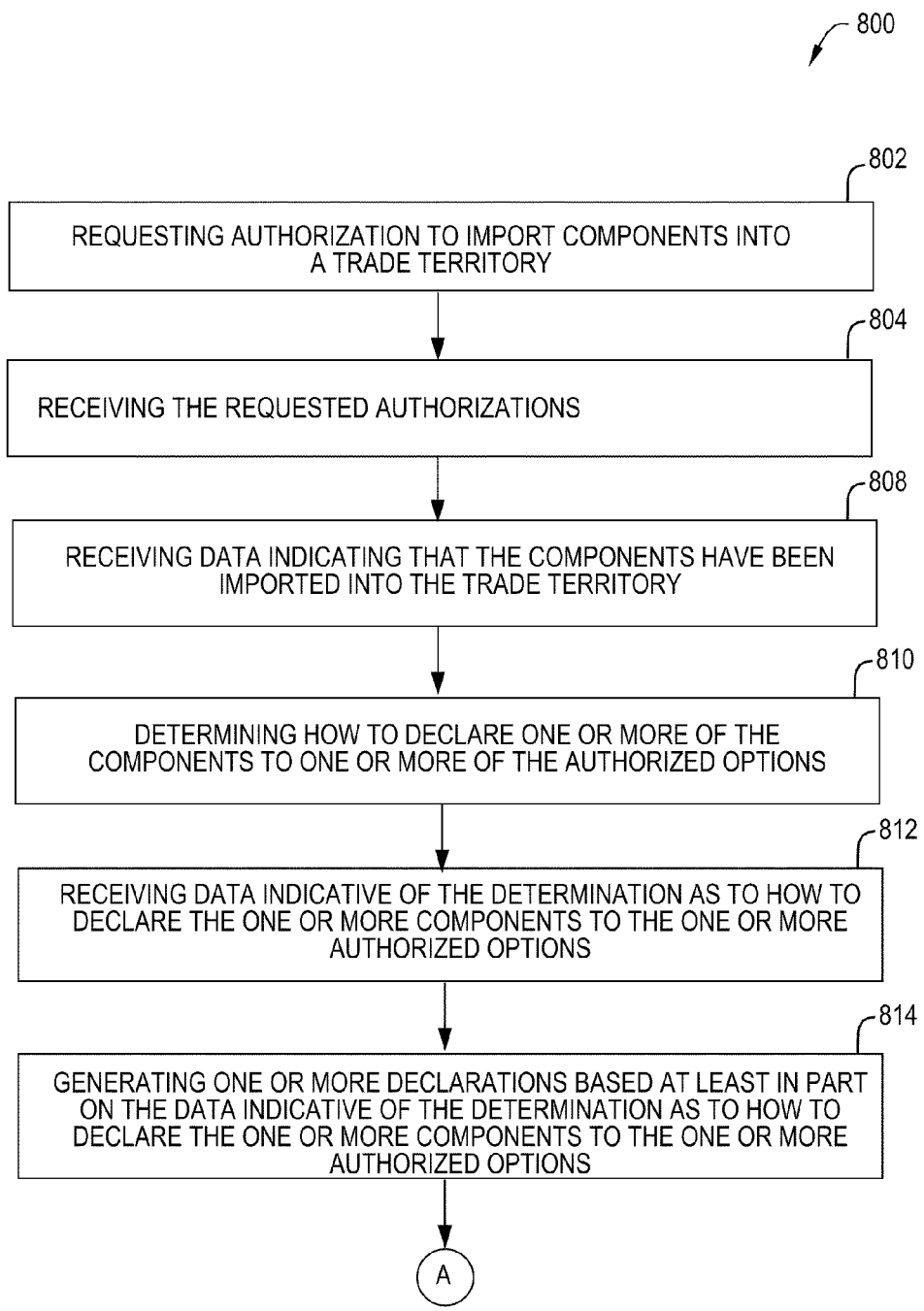
FIGS. 8A-8F are flow charts that illustrate a method according to some embodiments.
Figure 8B:
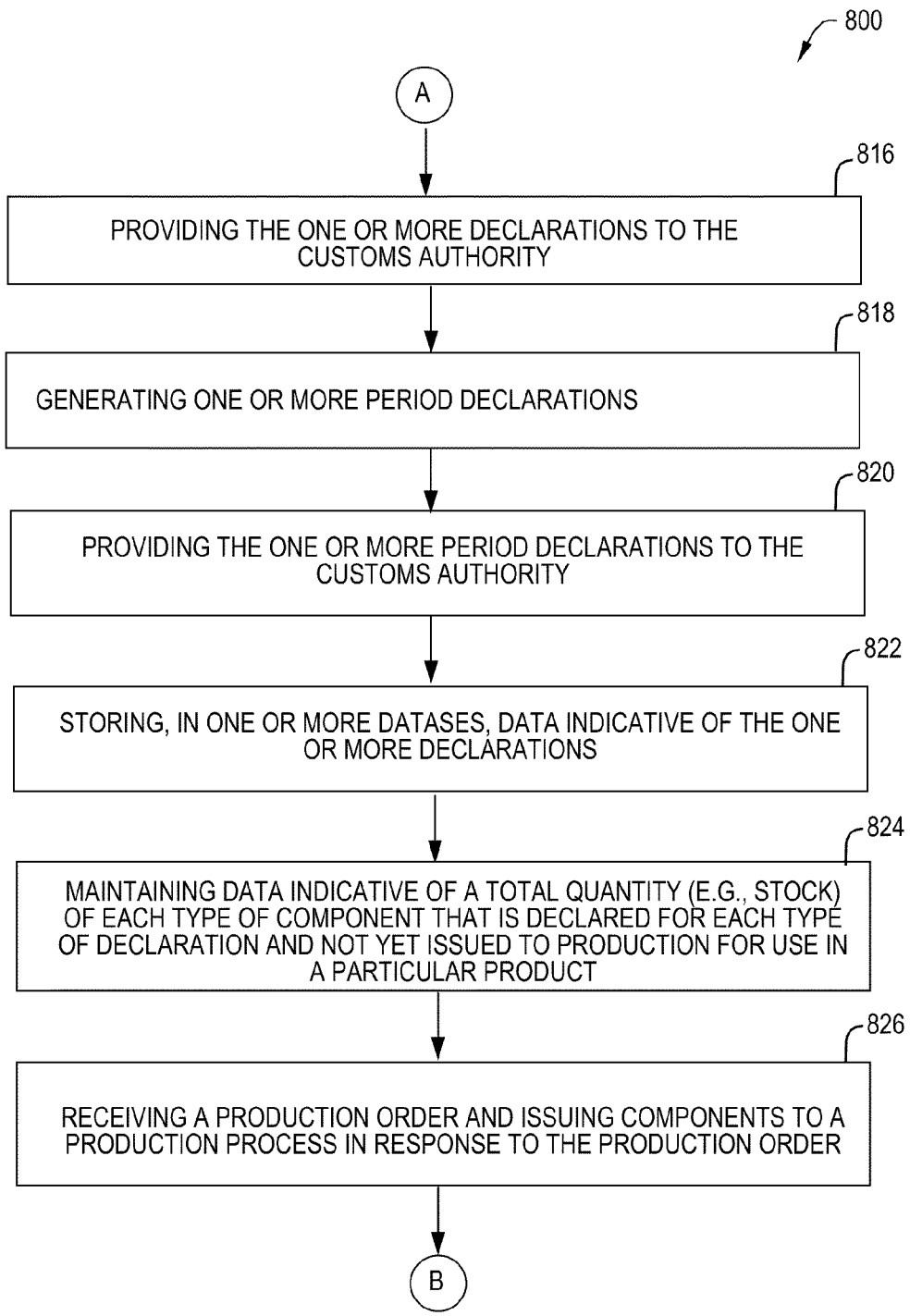
Figure 8C:
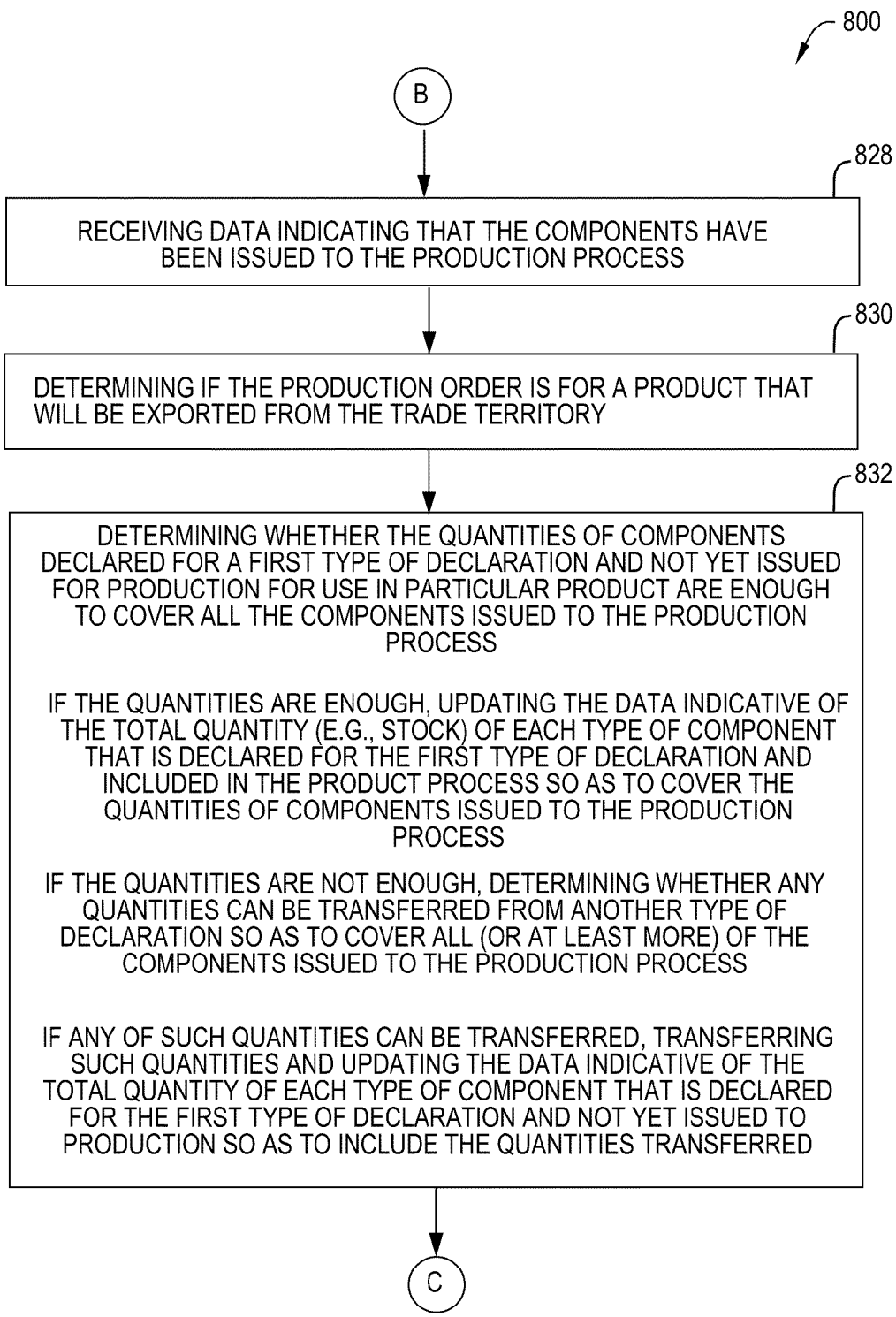
Figure 8D:
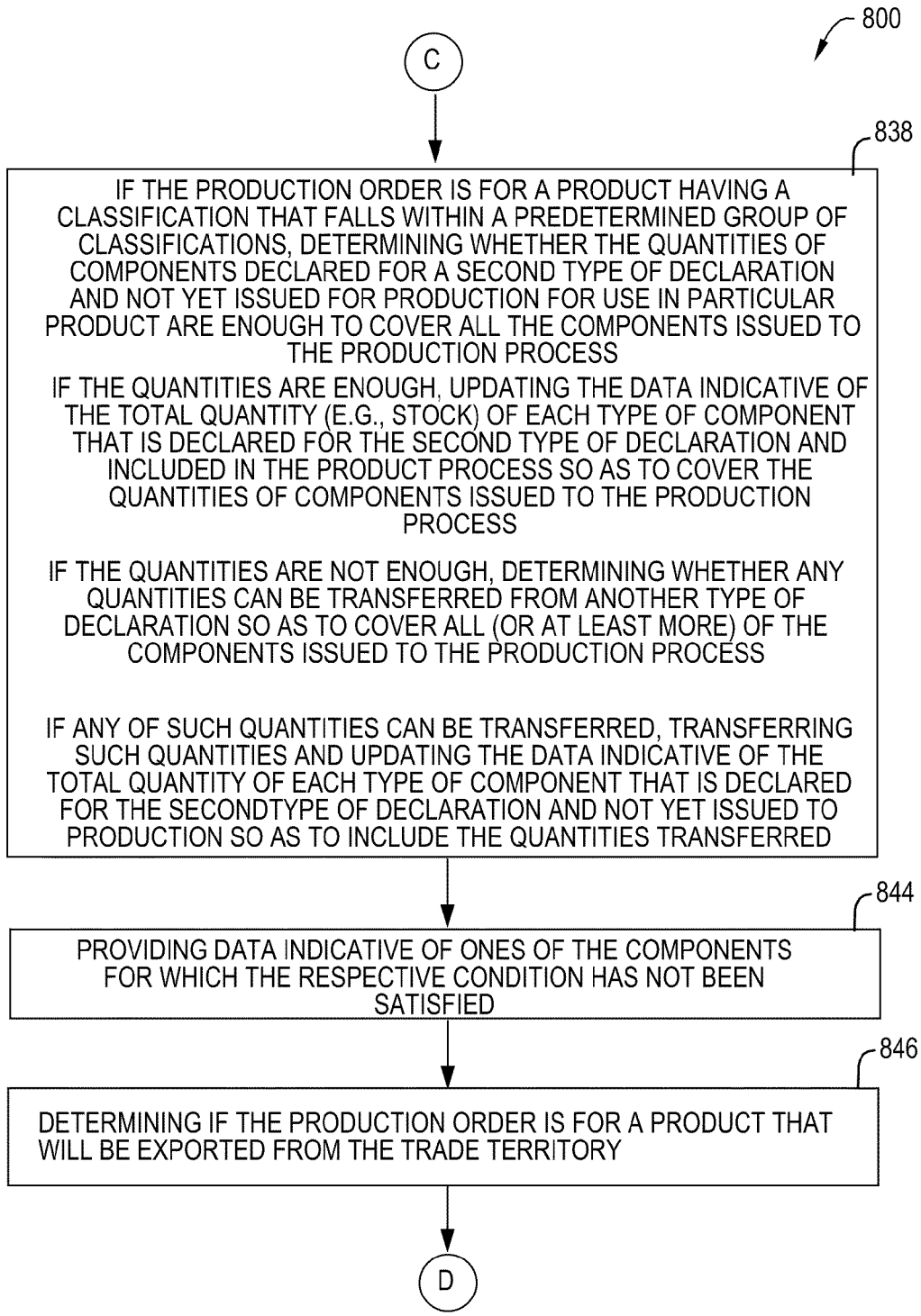
Figure 8E:
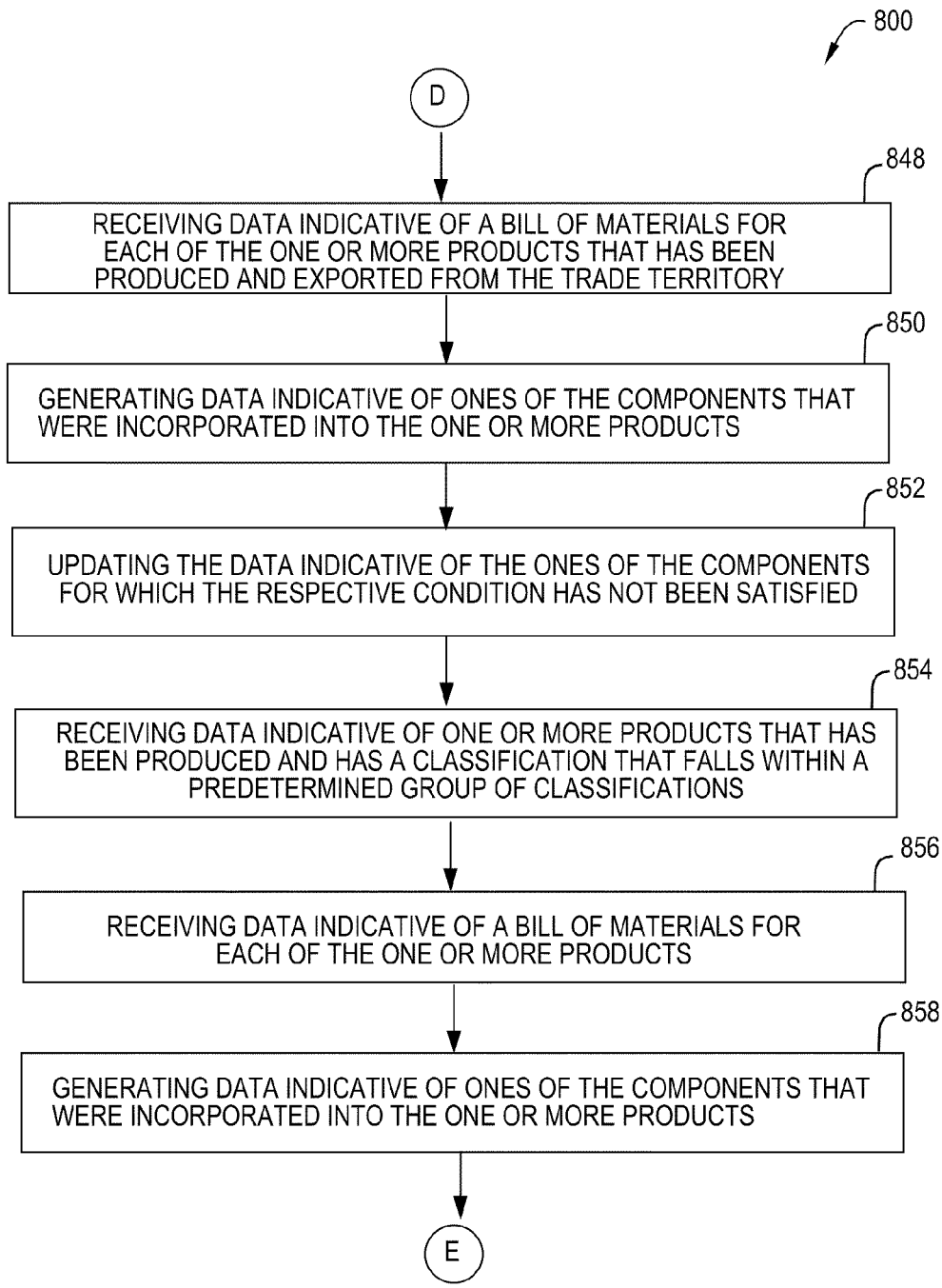
Figure 8F:
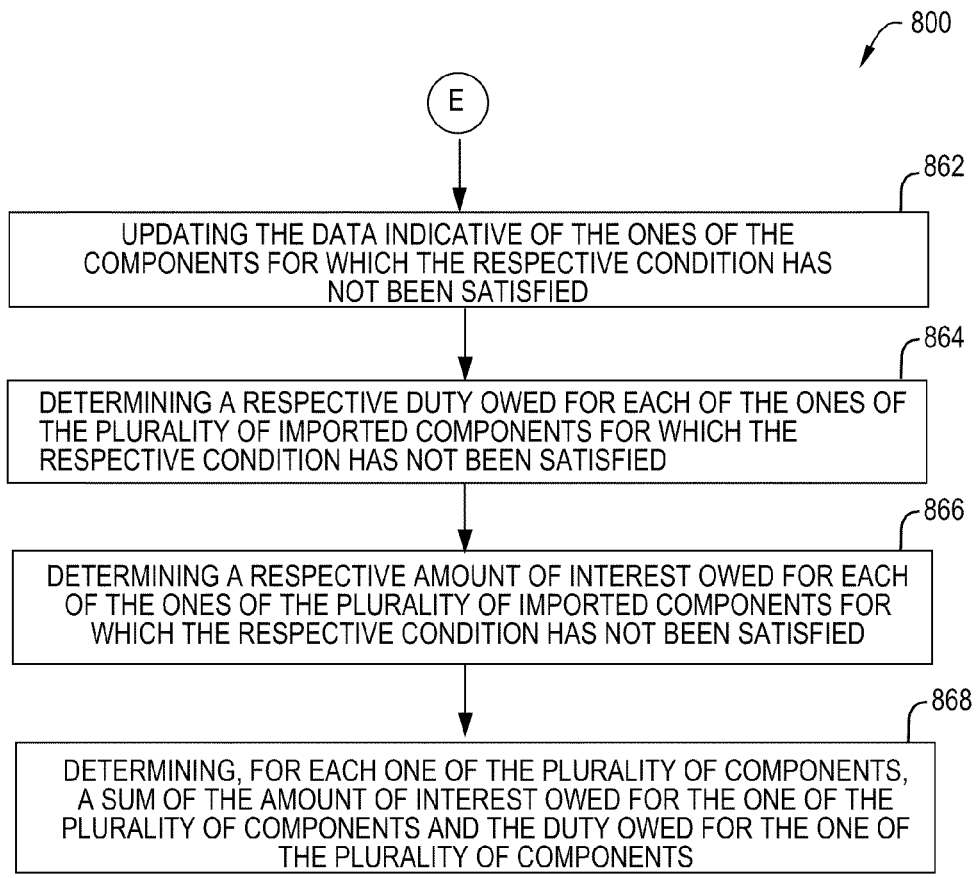

FIG. 7F illustrates a view in a graphical user interface that may be used in the system 104 to display data that the system includes to indicate whether a component will be incorporated into a product that will be exported, in accordance with some embodiments. In some embodiments, the system 104 includes similar data for each product to indicate whether the product will be exported.

At 832, if the production order is for a product that will be exported from the trade territory, the method may further include determining whether the quantities of components declared for the first type of declaration (e.g., inward processing relief) and not yet issued to production for use in a particular product are enough to cover all of the components issued to the production process at 826, i.e., whether the quantities of components declared for the first type of declaration (e.g., inward processing relief) and not yet issued to production for use in a particular product are greater than or equal to the quantities of components issued to the production process at 826.

If the quantities of components declared for the first type of declaration (e.g., inward processing relief) and not yet issued to production for use in a particular product are enough to cover all of the components issued to the production process, the method may further include updating the data indicative of the total quantity (e.g., stock) of each type of component that is declared for the first type of declaration (e.g., inward processing relief) and included in the product process at 826 so as to cover the quantities of components issued to the production process at 826.

If the data indicative of the total quantity of a component is in the form of a sum, the sum may be decreased by an amount equal to the quantity of that component issued to the production process at 826, thereby updating the data so as to reflect the quantity of the component issued to the production process at 826.

If the quantities of components declared for the first type of declaration (e.g., inward processing relief) and not yet issued to production for use in a particular product are not enough to cover all of the components issued to the production process at 826, the method may further include determining whether any quantities can be transferred from another type of declaration, e.g., the third declaration type (e.g., a customs warehouse) so as to cover all (or at least more) of the components issued to the production process.

If any of such quantities can be transferred, the method may further include transferring such quantities and updating the data indicative of the total quantity (e.g., stock) of each type of component that is declared for the first type of declaration (e.g., inward processing relief) and not yet issued to production so as to include the quantities transferred.

At 838, if the production order is not for a product that will be exported from the trade territory but rather is for a product having a classification that falls within a predetermined group of classifications that would result in reduction of import duties for the components incorporated therein, the method may further include determining whether the quantities of components declared for the second type of declaration (e.g., processing under customs control) and not yet issued to production for use in a particular product are enough to cover all of the components issued to the production process at 826, i.e., whether the quantities of components declared for the second type of declaration (e.g., processing under customs control) and not yet issued to production for use in a particular product are greater than or equal to the quantities of components issued to the production process at 826.

If the quantities of components declared for the second type of declaration (e.g., processing under customs control) and not yet issued to production for use in a particular product are enough to cover all of the components issued to the production process, the method may further include updating the data indicative of the total quantity (e.g., stock) of each type of component that is declared for the second type of declaration (e.g., processing under customs control) and included in the product process at 826 so as to cover the quantities of components issued to the production process at 826.

If the data indicative of the total quantity of a component is in the form of a sum, the sum may be decreased by an amount equal to the quantity of that component issued to the production process at 826, thereby updating the data so as to reflect the quantity of the component issued to the production process at 826.

If the quantities of components declared for the second type of declaration (e.g., processing under customs control) and not yet issued to production for use in a particular product are not enough to cover all of the components issued to the production process at 826, the method may further include determining whether any quantities can be transferred from another type of declaration, e.g., the third declaration type (e.g., a customs warehousing) so as to cover all (or at least more) of the components issued to the production process.

If any of such quantities can be transferred, the method may further include transferring such quantities and updating the data indicative of the total quantity (e.g., stock) of each type of component that is declared for the second type of declaration (e.g., processing under customs control) and not yet issued to production so as to include the quantities transferred.

As stated above, an imported component may be subject to an import duty if a respective condition associated with the imported component is not satisfied.

At 844, the method may further include providing data indicative of ones of the components for which the respective condition has not been satisfied. In some embodiments, such data will initially indicate that the respective condition has not been satisfied for any of the components.

At 846 the method may include receiving data indicative of one or more products that has been produced and exported from the trade territory since the components were imported.

At 848, the method may further include receiving data indicative of a bill of materials for each of the one or more products that has been produced and exported from the trade territory.

Figure 7G:
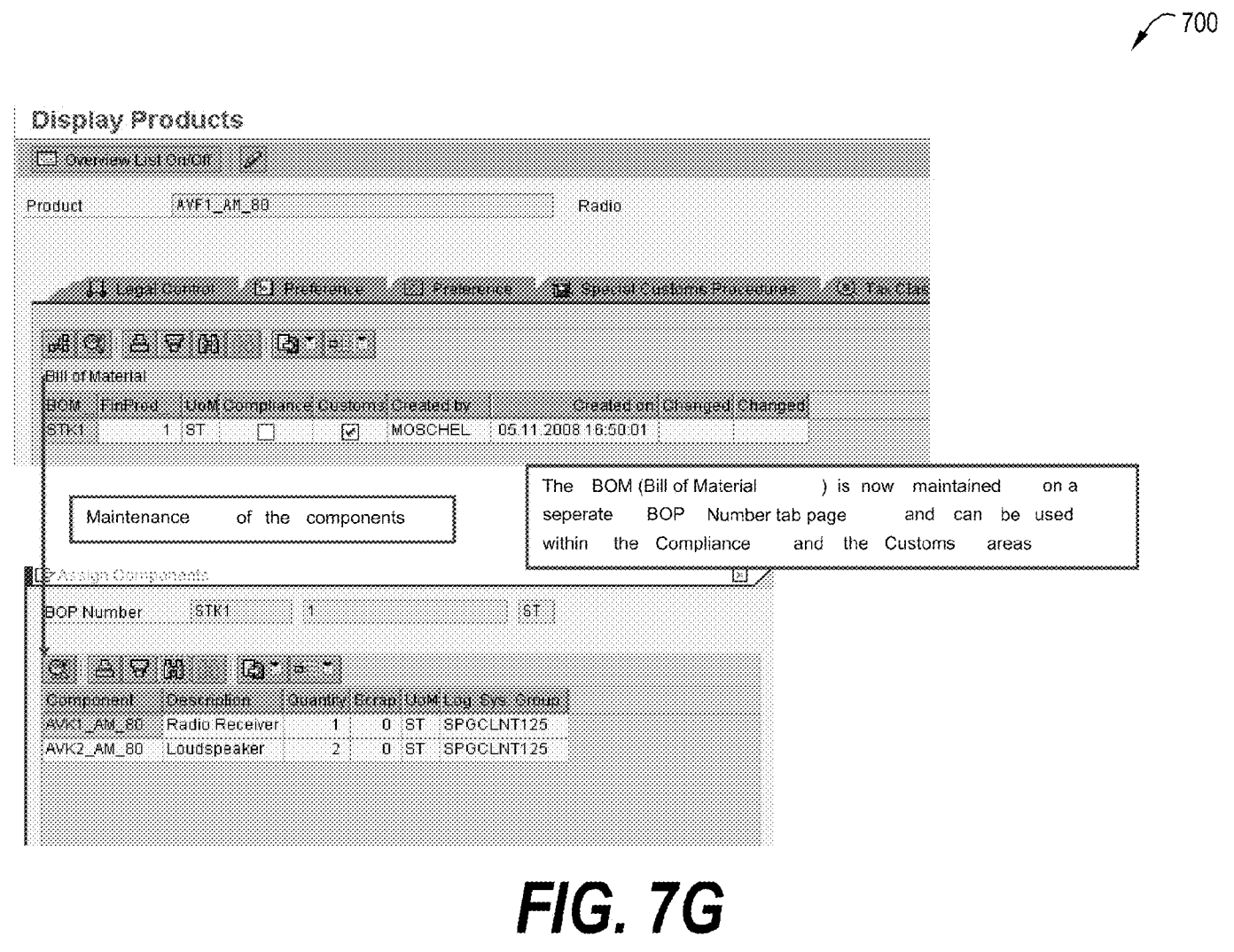

FIG. 7G illustrates a view in a graphical user interface that may be used in the system 104 to display data that the system includes that is indicative of a bill of materials for a product, in accordance with some embodiments. In some embodiments, the system 104 includes similar data for each product.

At 850, the method may further include generating data indicative of ones of the components that were incorporated into the one or more products. In some embodiments, such data is generated based at least in part on the data indicative of the plurality of imported components, the data indicative of one or more products that has been produced and exported from the trade territory since the plurality of components were imported, and the data indicative of the bill of materials for each of the one or more products.

In some embodiments, data is also generated based at least in part on a first in first out (FIFO) rule.

At 852, the method may further include updating the data indicative of the ones of the components for which the respective condition has not been satisfied. In some embodiments, the updating is based at least in part on the data indicative of the imported components and the data indicative of ones of the components that were incorporated into the one or more products produced and exported from the trade territory since the data indicative of ones of the plurality of imported components for which the respective condition has not been satisfied was provided or last updated, whichever occurred last.

At 854 the method may include receiving data indicative of one or more products that has been produced and has a classification that falls within a predetermined group of classifications that would result in reduction of import duties for components incorporated therein.

At 856, the method may further include receiving data indicative of a bill of materials for each of the one or more products that has been produced and have a classification that falls within a predetermined group of classifications that would result in reduction of import duties for components incorporated therein.

At 858, the method may further include generating data indicative of ones of the components that were incorporated into the one or more products. In some embodiments, such data is generated based at least in part on the data indicative of one or more products that has been produced and have a classification that falls within a predetermined group of classifications that would result in reduction of import duties for components incorporated therein, and the data indicative of the bill of materials for each of the one or more products.

At 862, the method may further include updating the data indicative of the ones of the components for which the respective condition has not been satisfied. In some embodiments, the updating is based at least in part on the data indicative of the imported components and the data indicative of ones of the components that were incorporated into the one or more products having a classification that falls within a predetermined group of classifications that would result in reduction (possibly to zero, i.e., waiver) of import duties for components incorporated therein, since the data indicative of ones of the plurality of imported components for which the respective condition has not been satisfied was provided or last updated, whichever occurred last.

At 864, the method may further include determining a respective duty owed for each of the ones of the plurality of imported components for which the respective condition has not been satisfied. In some embodiments, the method may further include determining a respective duty owed for ones of the plurality of imported components for which the respective condition has been satisfied but for which the duty is not reduced to zero, i.e., waived.

At 866, the method may further include determining a respective amount of interest owed for each of the ones of the plurality of imported components for which the respective condition has not been satisfied.

At 868, the method may further include determining, for each one of the plurality of components, a sum of the amount of interest owed for the one of the plurality of components and the duty owed for the one of the plurality of components.

As stated above, advantages may be provided by maintaining (i.e., providing and updating over time) data indicative of ones of the components for which the condition has not been satisfied. By maintaining such data, some or all of the processing required to determine the ones of the components for which the condition was not satisfied will be performed in advance of when such determination is needed. Consequently, less processing time and/or resources may be required when it is actually desired to determine the duties owed.

Figure 9:
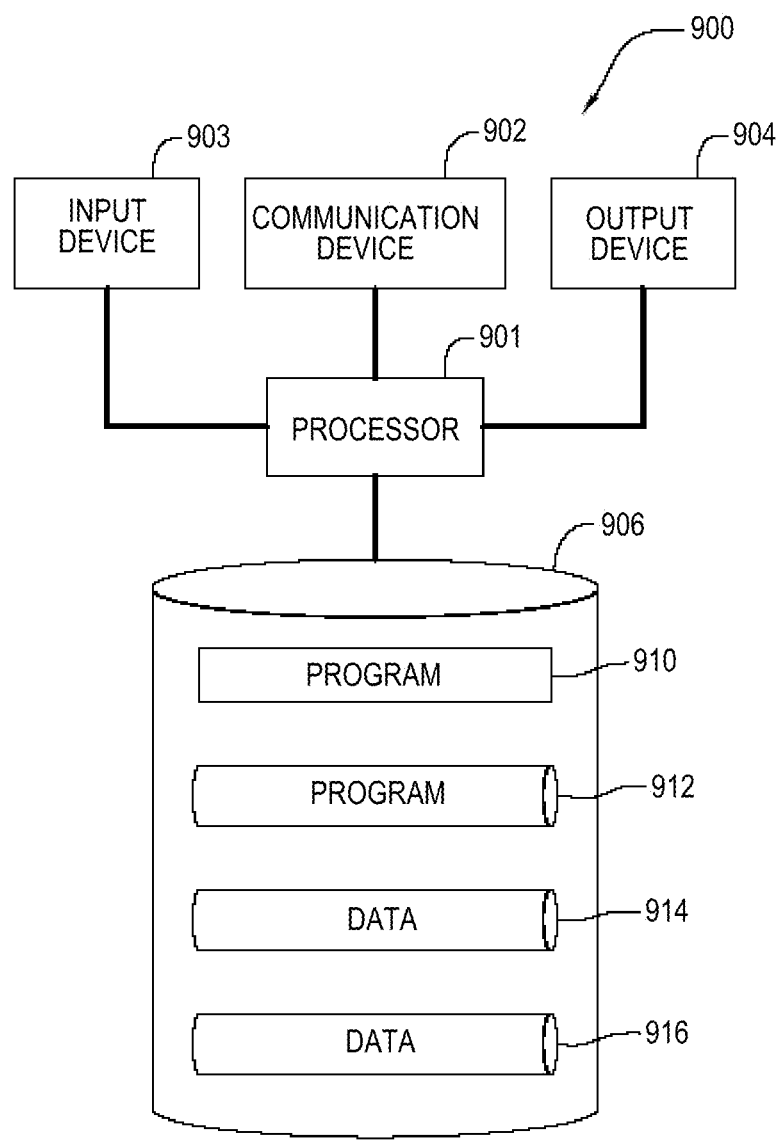
FIG. 9 is a schematic block diagram of an apparatus having an architecture according to some embodiments.

FIG. 9 is a block diagram of an apparatus 900 having an architecture according to some embodiments. In some embodiments, one or more of the systems (or portion(s) thereof) disclosed herein may have an architecture that is the same as and/or similar to the architecture of apparatus 900 (or portion(s) thereof).

Referring to FIG. 9, in accordance with some embodiments, the apparatus 900 includes a processor 901 coupled to a communication device 902, an input device 903, an output device 904 and a storage device 906.

In some embodiments, the processor 901 may execute processor-executable program code to provide one or more portions of one or more functions and/or one or more portions of one or more methods disclosed herein. In some embodiments, the processor 901 may comprise one or more INTEL® Pentium® processors.

The communication device 902 may be used to facilitate communication with other devices and/or systems. In some embodiments, communication device 902 may comprise an Ethernet and/or other type of connection to a network and/or resource and through which apparatus 900 may receive and/or transmit data.

The input device 903 may be used to input data. In some embodiments, the input device 903 may comprise a keyboard, a keypad, a track ball, a touchpad, a mouse or other pointing device, a microphone, a knob or a switch, an infra-red (IR) port and/or a computer media reader.

The output device 904 may be used to output data. In some embodiments, the output device 904 may comprise an IR port, a docking station, a display, a speaker and/or a printer.

The storage device 906 may store one or more programs 910-912 and/or other data for operation of the apparatus 900. In some embodiments, the one or more programs and/or other data may include one or more operating systems, one or more database management systems and/or other applications for operation of the apparatus 900. In some embodiments, the one or more programs 910-912 may include one or more instructions to be executed by the processor 901 to provide one or more portions of one or more functions and/or one or more portions of one or more methods disclosed herein. In some embodiments, the one or more programs and/or other data may include one or more databases 914-916.

In some embodiments, the storage device 906 may comprise one or more storage devices, such as, for example, magnetic storage devices (e.g., magnetic tape and/or hard disk drives), optical storage devices, and/or semiconductor memory devices such as Random Access Memory (RAM) devices and Read Only Memory (ROM) devices.

In some embodiments, one or more portions of one or more embodiments disclosed herein may be embodied in a system, a method, an apparatus and/or a computer-readable storage medium. A computer-readable storage medium may store thereon instructions that when executed by a processor (or multiple processors) result in performance of a process according to any of the embodiments described herein.

Unless stated otherwise, terms such as, for example, "comprises", "has", "includes", and all forms thereof, are considered open-ended, so as not to preclude additional elements and/or features. In addition, unless stated otherwise, terms such as, for example, "a", "one", "first", are considered open-ended, and do not mean "only a", "only one" and "only a first", respectively. Moreover, unless stated otherwise, the term "first" does not, by itself, require that there also be a "second".

In addition, unless stated otherwise, terms such as, for example, "in response to" and "based on" mean "in response at least to" and "based at least on", respectively, so as not to preclude being responsive to and/or based on, more than one thing.

In addition, unless stated otherwise, data may comprise any type of information and may have and/or be stored in any form. In some embodiments, data may be stored in raw, excerpted, summarized and/or analyzed form.

Unless stated otherwise, a processor may comprise any type of processor. For example, a processor may be programmable or non programmable, general purpose or special purpose, dedicated or non dedicated, distributed or non distributed, shared or not shared, and/or any combination thereof. A processor may include, but is not limited to, hardware, software, firmware, and/or any combination thereof. Hardware may include, but is not limited to off the shelf integrated circuits, custom integrated circuits and/or any combination thereof. In some embodiments, a processor comprises a microprocessor. Software may include, but is not limited to, instructions that are storable and/or stored on a computer readable medium, such as, for example, magnetic or optical disk, magnetic or optical tape, CD-ROM, DVD, RAM, EPROM, ROM or other semiconductor memory. A processor may employ continuous signals, periodically sampled signals, and/or any combination thereof. If a processor is distributed, two or more portions of the processor may communicate with one another through a communication link.

In addition, unless stated otherwise, a communication link may be any type of communication link, for example, but not limited to, wired (e.g., conductors, fiber optic cables) or wireless (e.g., acoustic links, electromagnetic links or any combination thereof including, for example, but not limited to microwave links, satellite links, infrared links), and/or combinations thereof, each of which may be public or private, dedicated and/or shared (e.g., a network). A communication link may or may not be a permanent communication link. A communication link may support any type of data in any form, for example, but not limited to, analog and/or digital (e.g., a sequence of binary values, i.e. a bit string) signal(s) in serial and/or in parallel form. The data may or may not be divided into blocks. If divided into blocks, the amount of data in a block may be predetermined or determined dynamically, and/or may be fixed (e.g., uniform) or variable. A communication link may employ a protocol or combination of protocols.

In addition, unless stated otherwise, a "database" may refer to one or more related or unrelated databases.

While various embodiments have been described, such description should not be interpreted in a limiting sense. It is to be understood that other embodiments may be practiced without departing from the spirit and scope of the invention, as recited in the claims appended hereto.

What is claimed is:

1. A non transitory computer-readable medium having stored thereon processor-executable instructions that when executed by at least one processor result in the following:
   receiving data indicative of a plurality of imported components, each one of the plurality of imported components being subject to an import duty if a respective condition associated with the imported component is not satisfied, wherein each one of the plurality of components is associated with a same common deadline to satisfy the respective condition associated with the one of the plurality of components;
   maintaining, in advance of the common deadline to satisfy the respective condition, data indicative of ones of the plurality of imported components for which the respective condition has not been satisfied;
      wherein the maintaining, in advance of the common deadline to satisfy the respective condition, data indicative of ones of the plurality of imported components for which the respective condition has not been satisfied comprises:
         providing, in advance of the common deadline to satisfy the respective condition, data indicative of ones of the plurality of imported components for which the respective condition has not been satisfied; and
         updating, at least monthly in advance of the common deadline to satisfy the respective condition, the data indicative of ones of the plurality of imported components for which the respective condition has not been satisfied; and
   after the maintaining, in advance of the common deadline to satisfy the respective condition, the data indicative of ones of the plurality of imported components for which the respective condition has not been satisfied, determining a respective duty owed for each of the ones of the plurality of imported components for which the respective condition has not been satisfied;
   wherein the data indicative of a plurality of imported components comprises data indicative of a plurality of components imported into a trade territory; and
   wherein for each one of the plurality of components, the respective condition associated with the one of the plurality of components is satisfied if, prior to the common deadline to satisfy the respective condition associated with the one of the plurality of components, the one of the plurality of components has been: (i) incorporated into a product that has been exported from the trade territory, (ii) incorporated into a product having a classification that falls within a predetermined group of classifications or (iii) scrapped.

2. The computer-readable medium of claim 1, wherein for each one of the plurality of components, the condition associated with the one of the plurality of components is satisfied if, prior to the common deadline to satisfy the respective condition associated with the one of the plurality of components, the one of the plurality of components has been incorporated into a product that has been exported from the trade territory.

3. The computer-readable medium of claim 1, wherein the updating the data indicative of ones of the plurality of imported components for which the respective condition has not been satisfied comprises:
   periodically updating the data indicative of ones of the plurality of imported components for which the respective condition has not been satisfied.

4. The computer-readable medium of claim 1, wherein the updating, at least monthly in advance of the common deadline to satisfy the respective condition, the data indicative of ones of the plurality of imported components for which the respective condition has not been satisfied comprises:
   updating, weekly in advance of the common deadline to satisfy the respective condition, the data indicative of ones of the plurality of imported components for which the respective condition has not been satisfied.

5. The computer-readable medium of claim 1, further having stored thereon processor-executable instructions that when executed by a processor result in the following:
   determining a respective amount of interest owed for each of the ones of the plurality of imported components for which the respective condition has not been satisfied.

6. The computer-readable medium of claim 5, further having stored thereon processor-executable instructions that when executed by a processor result in the following:
   determining, for each one of the plurality of components, a sum of the amount of interest owed for the one of the plurality of components and the duty owed for the one of the plurality of components.

7. The computer-readable medium of claim 1, wherein the updating, at least monthly in advance of the common deadline to satisfy the respective condition, the data indicative of ones of the plurality of imported components for which the respective condition has not been satisfied comprises:
   updating, at night, the data indicative of ones of the plurality of imported components for which the respective condition has not been satisfied.

8. The computer-readable medium of claim 1, wherein for each one of the plurality of components, the condition associated with the one of the plurality of components is satisfied if, prior to the common deadline, the one of the plurality of components has been incorporated into a product having a classification that falls within a predetermined group of classifications.

9. The computer-readable medium of claim 1, wherein the common deadline is a common deadline to incorporate each one of the plurality of components into one or more products that have been exported from the trade territory or have a classification that falls within a predetermined group of classifications.

10. The computer-readable medium of claim 1, wherein the common deadline is a common deadline to incorporate the plurality of components into one or more products that have been exported from the trade territory.

11. The computer-readable medium of claim 1, wherein the common deadline is a common deadline to incorporate the plurality of components into one or more products having a classification that falls within a predetermined group of classifications.

12. A method comprising:
  receiving, by a processor, data indicative of a plurality of imported components, each one of the plurality of imported components being subject to an import duty if a respective condition associated with the imported component is not satisfied, wherein each one of the plurality of components is associated with a same common deadline to satisfy the respective condition associated with the one of the plurality of components;
  maintaining, by a processor in advance of the common deadline to satisfy the respective condition, data indicative of ones of the plurality of imported components for which the respective condition has not been satisfied;
    wherein the maintaining, in advance of the common deadline to satisfy the respective condition, data indicative of ones of the plurality of imported components for which the respective condition has not been satisfied comprises:
      providing, in advance of the common deadline to satisfy the respective condition, data indicative of ones of the plurality of imported components for which the respective condition has not been satisfied; and
      updating, at least monthly in advance of the common deadline to satisfy the respective condition, the data indicative of ones of the plurality of imported components for which the respective condition has not been satisfied; and
  after the maintaining, in advance of the common deadline to satisfy the respective condition, the data indicative of ones of the plurality of imported components for which the respective condition has not been satisfied, determining, by a processor, a respective duty owed for each of the ones of the plurality of imported components for which the respective condition has not been satisfied;
  wherein the data indicative of a plurality of imported components comprises data indicative of a plurality of components imported into a trade territory; and
  wherein for each one of the plurality of components, the condition associated with the one of the plurality of components is satisfied if, prior to the common deadline to satisfy the respective condition associated with the one of the plurality of components, the one of the plurality of components has been: (i) incorporated into a product that has been exported from the trade territory, (ii) incorporated into a product having a classification that falls within a predetermined group of classifications or (iii) scrapped.

13. The method of claim 12, wherein for each one of the plurality of components, the condition associated with the one of the plurality of components is satisfied if, prior to the common deadline to satisfy the respective condition associated with the one of the plurality of components, the one of the plurality of components has been incorporated into a product that has been exported from the trade territory.

14. The method of claim 12, wherein the updating the data indicative of ones of the plurality of imported components for which the respective condition has not been satisfied comprises:
  periodically updating the data indicative of ones of the plurality of imported components for which the respective condition has not been satisfied.

15. The method of claim 12, wherein the updating the data indicative of ones of the plurality of imported components for which the respective condition has not been satisfied comprises:
  updating, weekly in advance of the common deadline to satisfy the respective condition, the data indicative of ones of the plurality of imported components for which the respective condition has not been satisfied.

16. The method of claim 12, further comprising:
  determining a respective amount of interest owed for each of the ones of the plurality of imported components for which the respective condition has not been satisfied.

17. The method of claim 16, further comprising:
  determining, for each one of the plurality of components, a sum of the amount of interest owed for the one of the plurality of components and the duty owed for the one of the plurality of components.

18. The method of claim 12, wherein the updating, at least monthly in advance of the common deadline to satisfy the respective condition, the data indicative of ones of the plurality of imported components for which the respective condition has not been satisfied comprises:
  updating, at night, the data indicative of ones of the plurality of imported components for which the respective condition has not been satisfied.

19. The method of claim 12, wherein for each one of the plurality of components, the condition associated with the one of the plurality of components is satisfied if, prior to the common deadline, the one of the plurality of components has been incorporated into a product having a classification that falls within a predetermined group of classifications.

20. A system comprising:
  at least one processor configured to:
    receive data indicative of a plurality of imported components, each one of the plurality of imported components being subject to an import duty if a respective condition associated with the imported component is not satisfied, wherein each one of the plurality of components is associated with a same common deadline to satisfy the respective condition associated with the one of the plurality of components;
    maintain, in advance of the common deadline to satisfy the respective condition, data indicative of ones of the plurality of imported components for which the respective condition has not been satisfied;
      wherein the maintain, in advance of the common deadline to satisfy the respective condition, data indicative of ones of the plurality of imported components for which the respective condition has not been satisfied comprises:
      provide, in advance of the common deadline to satisfy the respective condition, data indicative of ones of the plurality of imported components for which the respective condition has not been satisfied; and
      update at least monthly in advance of the common deadline to satisfy the respective condition, the data indicative of ones of the plurality of imported components for which the respective condition has not been satisfied; and
    after the maintain, in advance of the common deadline to satisfy the respective condition, the data indicative of ones of the plurality of imported components for which the respective condition has not been satisfied, determine a respective duty owed for each of the ones of the plurality of imported components for which the respective condition has not been satisfied;
    wherein the data indicative of a plurality of imported components comprises data indicative of a plurality of components imported into a trade territory;
    wherein for each one of the plurality of components, the condition associated with the one of the plurality of components is satisfied if, prior to the common deadline to satisfy the respective condition associated with the one of the plurality of components, the one of the plurality of components has been: (i) incorporated into a product that has been exported from the trade territory, (ii) incorporated into a product having a classification that falls within a predetermined group of classifications or (iii) scrapped.

21. The system of claim 20, wherein for each one of the plurality of components, the condition associated with the one of the plurality of components is satisfied if, prior to the common deadline to satisfy the respective condition associated with the one of the plurality of components, the one of the plurality of components has been incorporated into a product that has been exported from the trade territory.

22. The system of claim 20, wherein the update the data indicative of ones of the plurality of imported components for which the respective condition has not been satisfied comprises:
periodically update the data indicative of ones of the plurality of imported components for which the respective condition has not been satisfied.

23. The system of claim 20, wherein the update, at least monthly in advance of the common deadline to satisfy the respective condition, the data indicative of ones of the plurality of imported components for which the respective condition has not been satisfied comprises:
update, weekly in advance of the common deadline to satisfy the respective condition, the data indicative of ones of the plurality of imported components for which the respective condition has not been satisfied.

24. The system of claim 20, wherein the at least one processor is further to:
determine a respective amount of interest owed for each of the ones of the plurality of imported components for which the respective condition has not been satisfied.

25. The system of claim 24, wherein the at least one processor is further to:
determine, for each one of the plurality of components, a sum of the amount of interest owed for the one of the plurality of components and the duty owed for the one of the plurality of components.

26. The system of claim 20, wherein the update, at least monthly in advance of the common deadline to satisfy the respective condition, the data indicative of ones of the plurality of imported components for which the respective condition has not been satisfied comprises:
update, at night, the data indicative of ones of the plurality of imported components for which the respective condition has not been satisfied.

27. The system of claim 20, wherein for each one of the plurality of components, the condition associated with the one of the plurality of components is satisfied if, prior to the common deadline, the one of the plurality of components has been incorporated into a product having a classification that falls within a predetermined group of classifications.

28. A non transitory computer-readable medium having stored thereon processor-executable instructions that when executed by at least one processor result in the following:
receiving data indicative of a plurality of imported components that have been imported into a trade territory, each one of the plurality of imported components being subject to an import duty if the one of the plurality of imported components is not incorporated into a product that has been exported from the trade territory prior to a same common deadline for incorporating the plurality of components into one or more products that have been exported from the trade territory;
maintaining, in advance of the common deadline for incorporating the plurality of components into one or more products that have been exported from the trade territory, data indicative of ones of the plurality of imported components that have not been incorporated into a product that has been exported from the trade territory;
wherein the maintaining, in advance of the common deadline for incorporating the plurality of components into one or more products that have been exported from the trade territory, data indicative of ones of the plurality of imported components that have not been incorporated into a product that has been exported from the trade territory comprises:
providing, in advance of the common deadline for incorporating the plurality of components into one or more products that have been exported from the trade territory, data indicative of ones of the plurality of imported components that have not been incorporated into a product that has been exported from the trade territory; and
updating, at least monthly in advance of the common deadline for incorporating the plurality of components into one or more products that have been exported from the trade territory, the data indicative of ones of the plurality of imported components that have not been incorporated into a product that has been exported from the trade territory; and
after the maintaining, in advance of the common deadline for incorporating the plurality of components into one or more products that have been exported from the trade territory, data indicative of ones of the plurality of imported components that have not been incorporated into a product that has been exported from the trade territory, determining a respective duty owed for each of the ones of the plurality of imported components that have not been incorporated into a product that has been exported from the trade territory.

29. A non transitory computer-readable medium having stored thereon processor-executable instructions that when executed by at least one processor result in the following:
receiving data indicative of a plurality of imported components that have been imported into a trade territory, each one of the plurality of imported components being subject to an import duty if the one of the plurality of imported components is not incorporated into a product having a classification that falls within a predetermined group of classifications prior to a same common deadline for incorporating the plurality of components into one or more products having a classification that falls within a predetermined group of classifications;
maintaining, in advance of the common deadline for incorporating the plurality of components into one or more products having a classification that falls within a predetermined group of classifications, data indicative of ones of the plurality of imported components that have not been incorporated into a product having a classification that falls within a predetermined group of classifications;
wherein the maintaining, in advance of the common deadline for incorporating the plurality of components into one or more products having a classification that falls within a predetermined group of classifications, data indicative of ones of the plurality of imported components that have not been incorporated into a product having a classification that falls within a predetermined group of classifications comprises:

providing, in advance of the common deadline for incorporating the plurality of components into one or more products having a classification that falls within a predetermined group of classifications, data indicative of ones of the plurality of imported components that have not been incorporated into a product having a classification that falls within a predetermined group of classifications; and updating, at least monthly in advance of the common deadline for incorporating the plurality of components into one or more products having a classification that falls within a predetermined group of classifications, the data indicative of ones of the plurality of imported components that have not been incorporated into a product having a classification that falls within a predetermined group of classifications; and after the maintaining, in advance of the common deadline for incorporating the plurality of components into one or more products having a classification that falls within a predetermined group of classifications, data indicative of ones of the plurality of imported components that have not been incorporated into a product having a classification that falls within a predetermined group of classifications, determining a respective duty owed for each of the ones of the plurality of imported components that have not been incorporated into a product having a classification that falls within a predetermined group of classifications.

* * * * *